(12) United States Patent
Arai

(10) Patent No.: US 7,813,005 B2
(45) Date of Patent: Oct. 12, 2010

(54) METHOD AND APPARATUS FOR PROCESSING IMAGE DATA

(75) Inventor: Hiroshi Arai, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 1118 days.

(21) Appl. No.: 11/154,709

(22) Filed: Jun. 17, 2005

(65) Prior Publication Data

US 2005/0280867 A1  Dec. 22, 2005

(30) Foreign Application Priority Data

Jun. 17, 2004  (JP)  ............................. 2004-180217
May 10, 2005  (JP)  ............................. 2005-137446

(51) Int. Cl.
H04N 1/40  (2006.01)

(52) U.S. Cl. .................. 358/2.1; 358/474; 358/1.15; 358/1.9; 382/178; 382/292; 382/274; 382/252; 382/174

(58) Field of Classification Search .......... 382/275, 382/298, 266, 269, 263, 264, 252, 233, 274, 382/174, 175, 176, 177, 178, 292; 358/437, 358/1.9, 461, 474, 2.1, 3.26, 463, 1.15, 468
See application file for complete search history.

(56) References Cited

U.S. PATENT DOCUMENTS

| | | | |
|---|---|---|---|
| 5,028,992 A | 7/1991 | Arai | |
| 5,214,470 A | 5/1993 | Denber | |
| 5,454,052 A * | 9/1995 | Kojima | 382/233 |
| 5,862,266 A * | 1/1999 | Hunter | 382/266 |
| 5,870,503 A * | 2/1999 | Kumashiro | 382/252 |
| 5,949,907 A * | 9/1999 | Raz | 382/205 |
| 5,987,221 A * | 11/1999 | Bearss et al. | 358/1.9 |
| 6,035,072 A | 3/2000 | Read | |
| 6,192,152 B1 * | 2/2001 | Funada et al. | 382/199 |
| 6,243,500 B1 * | 6/2001 | Kawamoto | 382/275 |
| 6,728,418 B1 * | 4/2004 | Kumagai et al. | 382/275 |
| 6,744,532 B1 * | 6/2004 | Chen | 358/1.9 |
| 6,771,838 B1 * | 8/2004 | Fan | 382/274 |
| 7,348,991 B1 * | 3/2008 | Keating et al. | 345/589 |
| 7,355,758 B2 * | 4/2008 | Desai | 358/400 |
| 7,420,700 B2 * | 9/2008 | Hayashi | 358/1.15 |
| 7,450,268 B2 * | 11/2008 | Martinez et al. | 358/1.9 |
| 7,453,607 B2 * | 11/2008 | Hiromatsu | 358/474 |
| 7,515,298 B2 * | 4/2009 | Suzuki et al. | 358/1.9 |
| 7,518,757 B2 * | 4/2009 | Chizawa et al. | 358/461 |

(Continued)

FOREIGN PATENT DOCUMENTS

JP  2000-196881  7/2000

(Continued)

Primary Examiner—David K Moore
Assistant Examiner—Ashish K Thomas
(74) Attorney, Agent, or Firm—Oblon, Spivak, McClelland, Maier & Neustadt, L.L.P.

(57) ABSTRACT

An apparatus includes: a reading unit that obtains image data by reading a document through a reading glass; a detecting unit that detects a dirty place on the reading glass; a determining unit that determines a type of each area in the image data; an edge enhancing unit that applies an edge enhancement to each area based on the type determined; and a control unit that controls, when the type of an area determined is a text area, and when the area overlaps the dirty place detected, an amount of the edge enhancement for the area.

17 Claims, 20 Drawing Sheets

U.S. PATENT DOCUMENTS

| | | | |
|---|---|---|---|
| 2001/0028750 A1* | 10/2001 | Asakura | 382/298 |
| 2002/0075523 A1* | 6/2002 | Saida et al. | 358/437 |
| 2002/0176634 A1* | 11/2002 | Ohashi | 382/275 |
| 2003/0026495 A1 | 2/2003 | Gondek et al. | |

FOREIGN PATENT DOCUMENTS

| | | |
|---|---|---|
| JP | 2001-103249 | 4/2001 |
| JP | 3313098 | 5/2002 |
| JP | 2002-185728 | 6/2002 |
| JP | 3337993 | 8/2002 |
| JP | 2002-271620 | 9/2002 |

\* cited by examiner

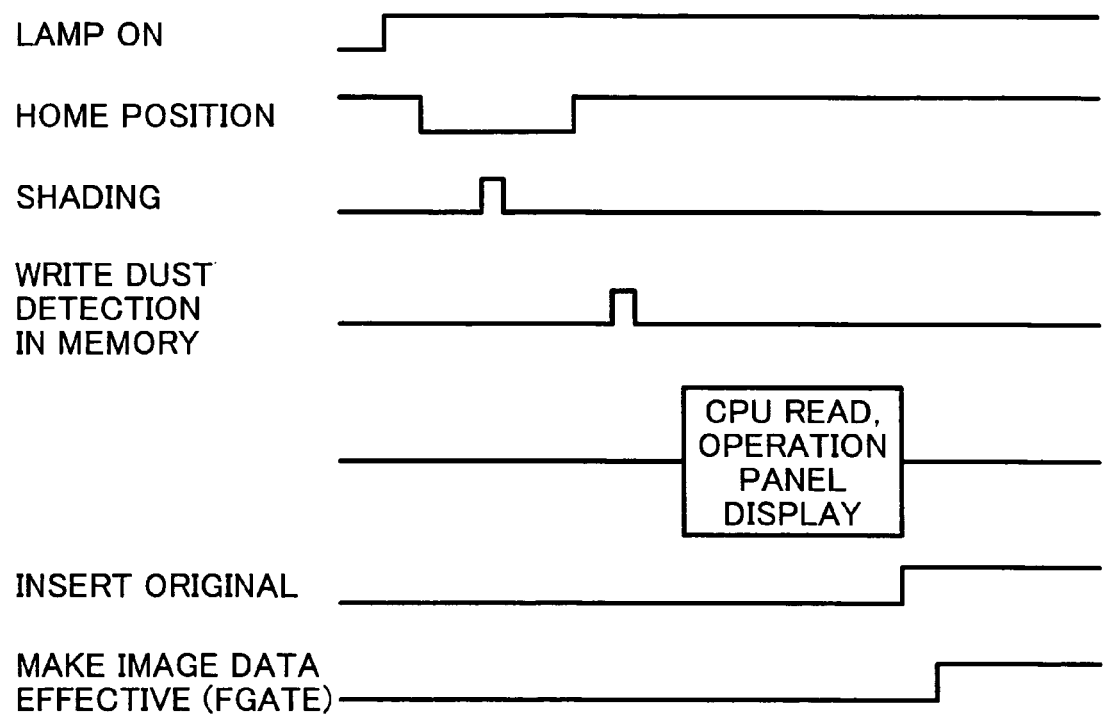
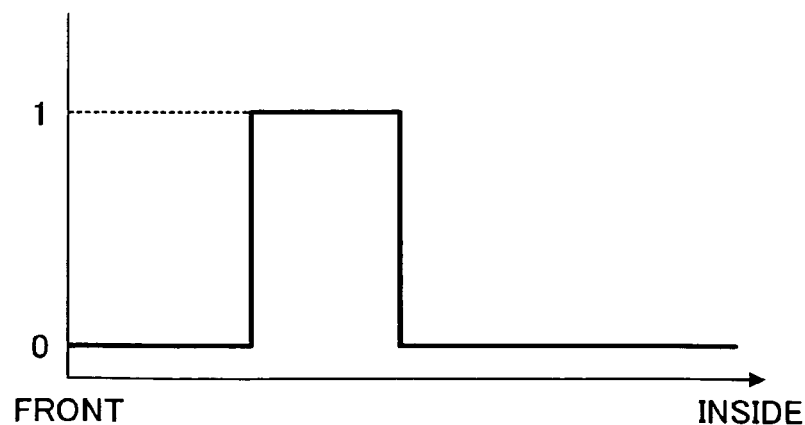

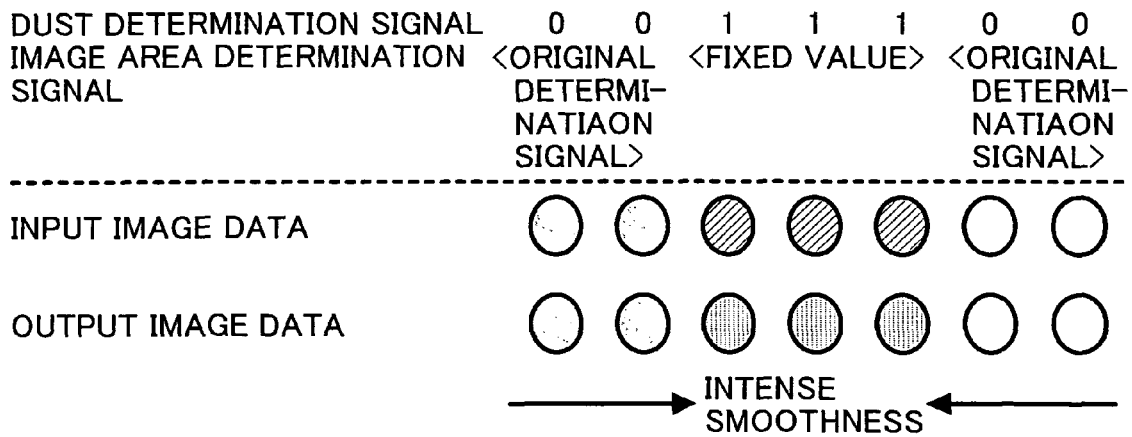
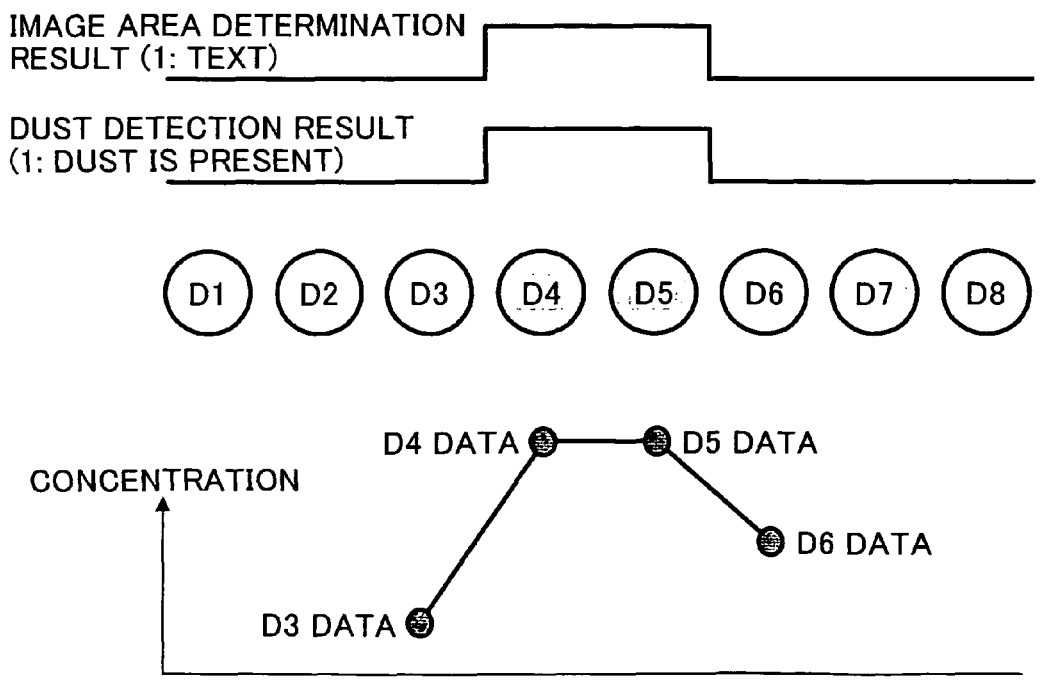

METHOD AND APPARATUS FOR PROCESSING IMAGE DATA

CROSS-REFERENCE TO RELATED APPLICATIONS

The present document incorporates by reference the entire contents of Japanese priority document, 2004-180217 filed in Japan on Jun. 17, 2004 and 2005-137446 filed in Japan on May 10, 2005.

BACKGROUND OF THE INVENTION

1. Field of the Invention

The present invention relates to a dust-detection technology for an image processing apparatus, such as a digital copying machine, that includes a sheet-through document feeder (SDF).

2. Description of the Related Art

In recent years, an image processing apparatus adopting a sheet-through scan system, which is called a sheet-through document feeder (SDF), has been used as one of the image processing apparatuses. The image processing apparatus adopting the sheet-through scan system automatically feeds an original with the SDF and causes the automatically fed original to pass on an SDF original glass where a carriage, which holds a light source and a plurality of mirrors, is located. An image of the original is reflected on the mirrors. The image processing apparatus focuses the image of the original on a charge coupled device (CCD) via a lens to thereby output the image of the original as image data. An image processing apparatus adopting a conventional system reciprocatingly moves a carriage in a sub-scanning direction with respect to an original, which is placed on a contact glass, to read an image of the original. Compared with the image processing apparatus adopting the conventional system, the image processing apparatus of the sheet-through scan system has an advantage that a structure thereof is simplified.

In the image processing apparatus adopting the sheet-through scan system, there is a deficiency in that a deposit such as dust moves onto the SDF original glass from an original to cause a vertical streak on an image. This is because, in the sheet-through scan system, since the original moves, images of the deposit or a scratch are continuously formed in the sub-scanning direction on the SDF original glass.

The image reading apparatus disclosed in Japanese Patent Application Laid-Open No. 2002-185728 mechanically moves an original reading position when dust, a scratch, or the like is detected and finds a position where no dust, scratch, or the like is present. When dust, a scratch, or the like is detected in all areas of reading positions, the image reading apparatus urges a user to clean a reading window glass.

However, the image reading apparatus disclosed in Japanese Patent Application Laid-Open No. 2002-185728 requires an additional mechanism to find a position where no dust, scratch, or the like is present. This leads to an increase in cost.

When dust, a scratch, or the like is present in areas of reading positions, since the dust, the scratch, or the like is recognized as a character, edge enhancement occurs.

SUMMARY OF THE INVENTION

It is an object of the present invention to at least solve the problems in the conventional technology.

An apparatus according to an aspect of the present invention, which processes image data including a plurality of areas of different types, includes: a reading unit that obtains the image data by reading a document through a reading glass; a detecting unit that detects a dirty place on the reading glass; a determining unit that determines a type of each of the areas in the image data; an edge enhancing unit that applies an edge enhancement to each of the areas based on the type determined; and a control unit that controls, when the type of an area determined is a text area, and when the area overlaps the dirty place detected, an amount of the edge enhancement for the area.

An apparatus according to another aspect of the present invention, which processes image data including a plurality of areas of different types, includes: a reference member that is substantially white; a reading unit that obtains a first image data by reading a document through a reading glass, and a second image data by reading the reference member through the reading glass; a detecting unit that detects a dirty place of the reading glass based on the second image data; a first determining unit that determines a type of each of the areas in the first image data to output a first type; a second determining unit that re-determines, when the type of an area determined is a text area, and when the area overlaps the dirty place detected, the type of the area to output a second type; and an image processing unit that applies an image processing to each of the areas in the first image data based on the first type or the second type.

A method according to still another aspect of the present invention, which is a method for processing image data including a plurality of areas of different types, includes: obtaining the image data by reading a document through a reading glass; detecting a dirty place on the reading glass; determining a type of each of the areas in the image data; applying an edge enhancement to each of the areas based on the type determined; and controlling, when the type of an area determined is a text area, and when the area overlaps the dirty place detected, an amount of the edge enhancement for the area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a timing chart of operations at the time when an original is read by the SDF;

FIG. 12 is a diagram for explaining a pulse position for detecting a position of dust;

FIG. 19 is a diagram for explaining an example of correction of input image data using a fixed value without using an image area determination signal;

FIG. 20A is a diagram for explaining a state in which correction processing is not performed when image data D4 and D5 are dust data;

DETAILED DESCRIPTION OF THE PREFERRED EMBODIMENTS

Exemplary embodiments of the present invention are explained in detail below with reference to the accompanying drawings.

Figure 1:
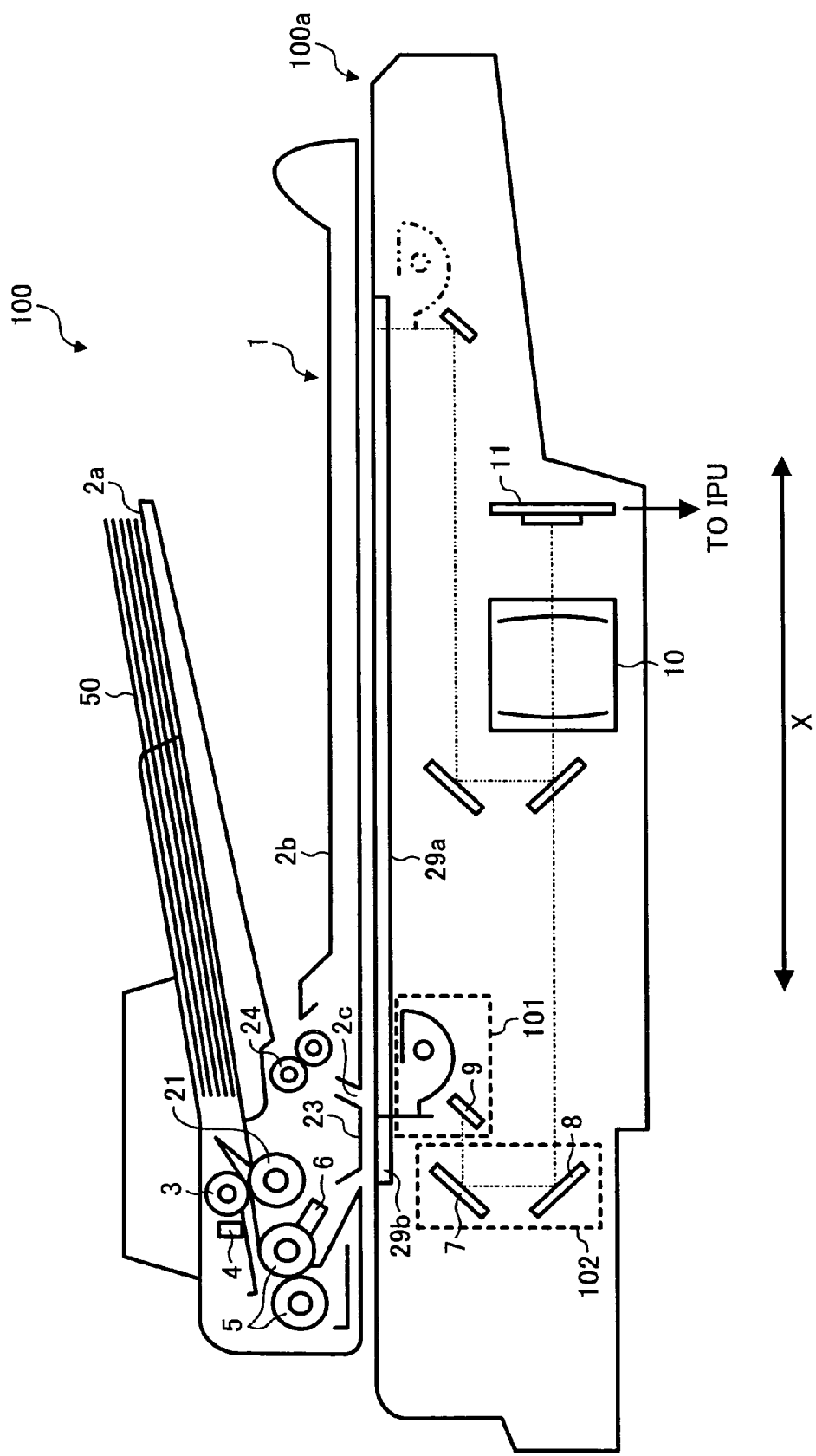
FIG. 1 is a schematic longitudinal sectional side view of an internal structure of a scanner apparatus according to a first embodiment of the present invention.
Figure 2:
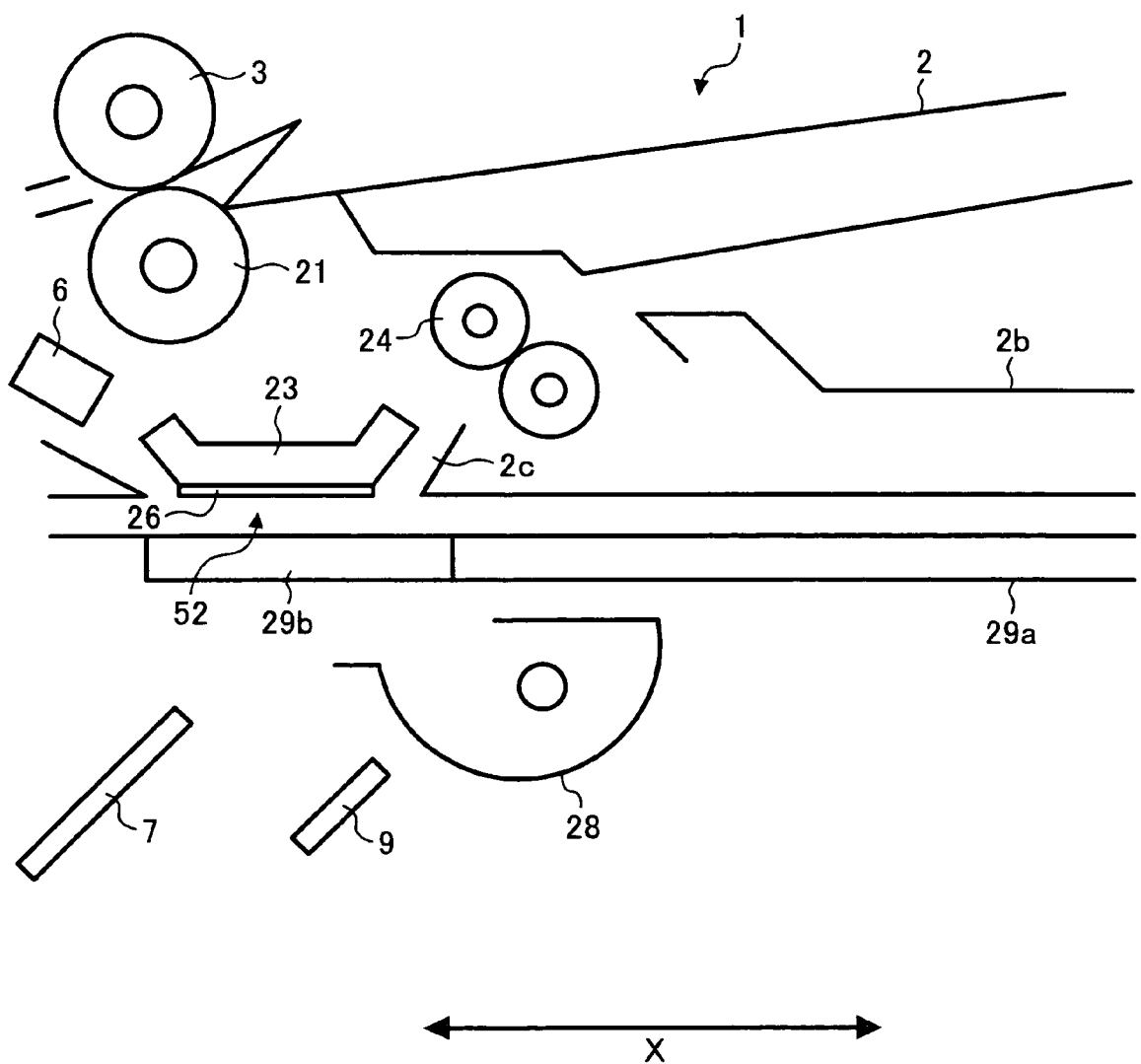
FIG. 2 is an enlarged longitudinal sectional side view of a section near an SDF original glass.

FIG. 1 is a schematic longitudinal sectional side view of an internal structure of a scanner apparatus 100 according to a first embodiment of the present invention. FIG. 2 is an enlarged longitudinal sectional view of a section near an SDF original glass 29b. In this embodiment, a scanner apparatus included in a digital copying machine is applied as an image processing apparatus.

As shown in FIG. 1 or 2, the scanner apparatus 100 includes a scanner body 100a and a sheet-through document feeder (SDF) 1, which is a type of an automatic document feeder (ADF) and serves as an original conveying mechanism, provided above the scanner body 100a. An original pressing member (not shown), which is a white resin sheet, is provided in a bottom section of the SDF 1. This original pressing member also functions as a platen.

On an upper surface of the scanner body 100a, an original placing glass 29a and the SDF original glass 29b are provided. An original is placed on the original placing glass 29a when an image of the original is read in an original stationary mode. The SDF original glass 29b is a reading glass that is used when an image of the original is read in an original conveyance mode.

The original stationary mode is an operation mode for reading an image of an original placed on the original placing glass 29a. The original conveyance mode is an operation mode for reading an image of an original, which is automatically fed by the SDF 1, when the original passes on the SDF original glass 29b. Note that it is possible to set the operation modes with an operation panel P (see FIG. 3).

A first carriage 101, which includes a lighting lamp (a Xe lamp) 28 serving as a light source and a mirror 9, is arranged in a position below the original placing glass 29a and opposed to the original placing glass 29a inside the scanner body 100a. The first carriage 101 moves freely in a sub-scanning direction X along the original placing glass 29a. A second carriage 102 including two mirrors 7 and 8 is arranged on a reflection optical path of the first carriage 101. The second carriage 102 moves freely in the sub-scanning direction X along the original placing glass 29a. A sensor board unit (SBU) 11a, which is a CCD drive unit mounted with a charge coupled device (CCD) 11 serving as an image sensor via a lens 10, is located on a reflection optical path of the second carriage 102.

A stepping motor is coupled to the first carriage 101 and the second carriage 102 by a pulley, a wire, and the like (all of which are not shown in the figure). The stepping motor is set to move freely in the identical sub-scanning direction X at a speed ratio of 2:1 from the left to the right in FIG. 1. The first carriage 101 and the second carriage 102 form a scanning optical system. When the two carriages 101 and 102 move in this way, an image of an original placed on the original placing glass 29a is scanned to be read in the sub-scanning direction X by the CCD 11. Therefore, an original reading mechanism is formed. The original is scanned to be read through the movement of the two carriages 101 and 102 of the original reading mechanism in the original stationary mode.

In the original conveyance mode, the first carriage 101 and the second carriage 102 are stopped in a home position below the SDF original glass 29b. The first carriage 101 and the second carriage 102 read and scan an original automatically fed by the SDF 1. The SDF 1 includes an original table 2a for placing an original in reading the original in the original conveyance mode, a sheet discharge table 2b for discharging an original that has been read, and a conveyance path 2c communicating from the original table 2a to the sheet discharge table 2b.

The original table 2a includes an original guide (not shown) that guides both side ends of an original placed thereon when originals 50 are conveyed to the conveyance path 2c. The original table 2a also includes a set sensor that detects whether an original is placed on the original table 2a when the originals 50 are read in the original conveyance mode, a width detection sensor and an original length sensor that detect a size of the original placed on the original table 2a, and an original trailing edge sensor that detects a trailing edge of the original (all of the sensors are not shown in the figure). In the original conveyance mode, even if a size of an original is designated by depressing a sheet designation key or a numeric key, a size of an original placed on the original table 2a is automatically designated by these sensors.

A sheet feed roller 3, a separation roller 21, a registration switch 4, registration rollers 5, and a timing switch 6 are provided on the original table 2a side of the conveyance path 2c. The sheet feed roller 3 and the registration rollers 5 are driven by a sheet feed motor (not shown). Consequently, the originals 50 placed on the original table 2a are conveyed to an original reading position 52 (see FIG. 2) one by one by the sheet feed roller 3. The registration switch 4 and the registration rollers 5 play a role of regulating skew feed of the original 50 and adjusting an original leading edge before the original 50 is conveyed to the original reading position 52. The timing switch 6 determines timing for reading a leading edge of an image of the original 50 which is being conveyed. A signal obtained from the timing switch 6 is communicated to a control device (not shown) in the digital copying machine as information.

Sheet discharge rollers 24 for conveying the original 50 in the conveyance path 2c to the sheet discharge table 2b is provided in the conveyance path 2c. The sheet discharge rollers 24 are also driven by the stepping motor (not shown). The SDF original glass 29b serving as a reading glass is located on the conveyance path 2c between the registration rollers 5 and the sheet discharge rollers 24. A strip-like guide member 23 is provided on the SDF original glass 29b between the registration rollers 5 and the sheet discharge rollers 24. The guide member 23 is a conveyance-path-forming member forming a part of the conveyance path 2c and extends in a main scanning direction orthogonal to the sub-scanning direction X. The guide member 23 is also used for performing shading correction of the CCD 11. For that purpose, a white sheet 26 is stuck to the guide member 23. Therefore, the original 50 fed to the conveyance path 2c from the original table 2a is guided between the guide member 23 and the SDF original glass 29b when the sheet feed roller 3, the registration rollers 5, and the sheet discharge rollers 24 are driven to rotate by the stepping motor.

The original 50 set on the original table 2a is conveyed to the original reading position 52, that is, a position of the guide member 23 according to rotation of the sheet feed roller 3 and the registration rollers 5. Before reading of the original 50 is started, the lighting lamp 28 is turned on and light from the lighting lamp 28 is condensed by a reflector and irradiated on a surface of the original 50. The original 50 is conveyed at constant speed according to the rotation of the registration rollers 5. An image on the entire surface of the original 50 is read by the CCD 11. The original 50 subjected to reading processing by the CCD 11 is discharged to the sheet discharge table 2b according to rotation of the sheet discharge rollers 24. Thereafter, the originals 50 placed on the original table 2a are read one after another.

Figure 3:
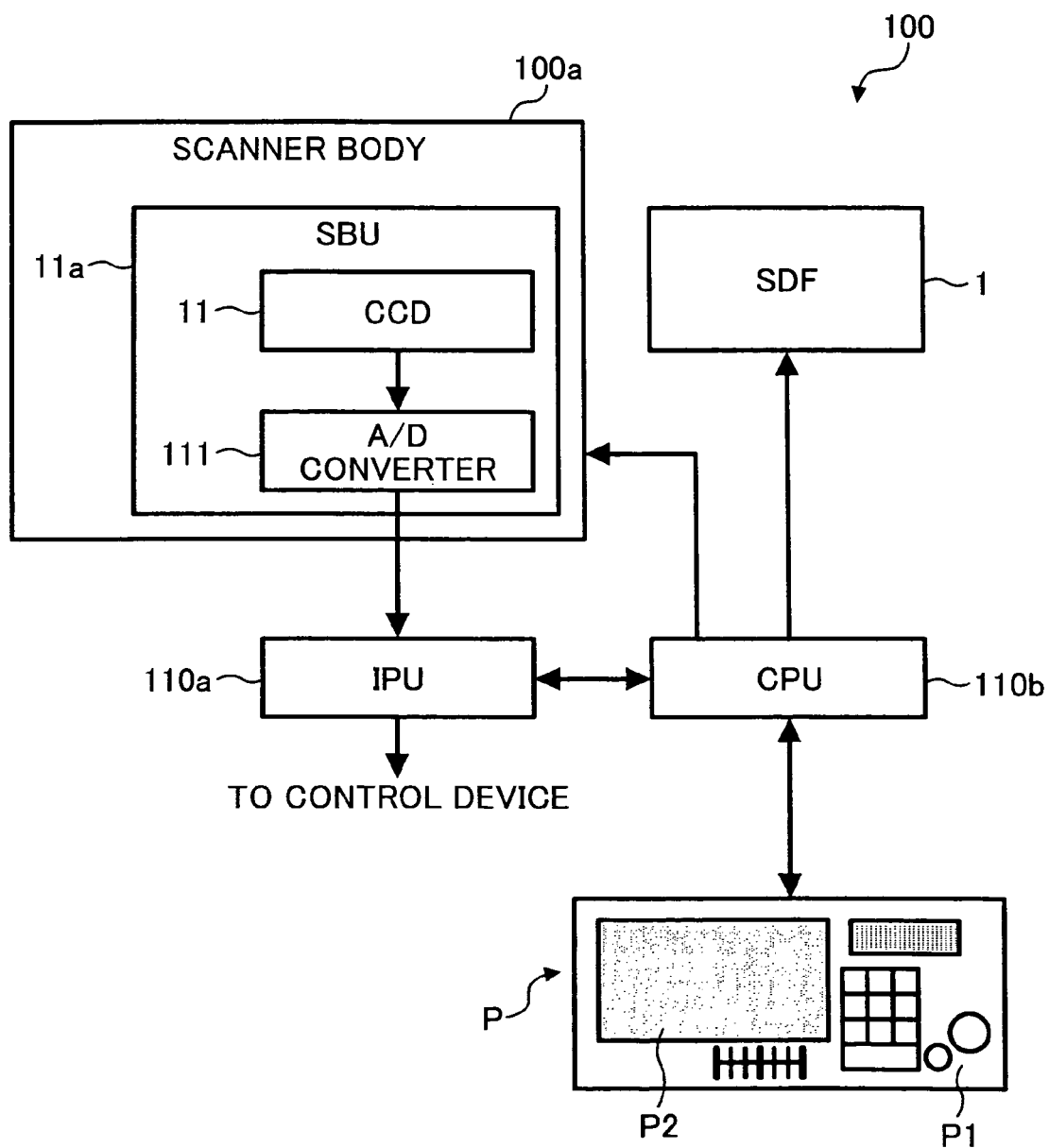
FIG. 3 is a block diagram of an example of an electric system of the scanner apparatus.

FIG. 3 is a block diagram of an example of an electric system of the scanner apparatus 100. As shown in FIG. 3, a reflected light from the original 50 made incident on the CCD 11 is converted into an analog image signal in the SBU 11a. The analog image signal is inputted to an analog to digital (A/D) converter 111 and converted into a digital image signal. The digital image signal is outputted to an instruction processing unit (IPU) 110a serving as an image processing LSI. After being subjected to various kinds of image processing like shading correction, gamma correction, and modulation transfer function (MTF) correction in the IPU 110a, the digital image signal is stored in a memory (not shown) as image data. The image data stored in the memory is transferred to the control device (not shown) in the digital copying machine. As shown in FIG. 3, the scanner apparatus 100 includes a CPU 110b that controls the SDF 1 and the operation panel P. The CPU 110b is also connected to the IPU 110a and sets parameters necessary for image processing in the IPU 110a.

The operation panel P includes an operation unit P1 on which a copy start key and the like are arranged and a display unit P2 that is formed by stacking a touch panel and is capable of displaying predetermined items. A user can set mode information necessary for setting parameters arbitrarily by operating the operation panel P.

Figure 4:
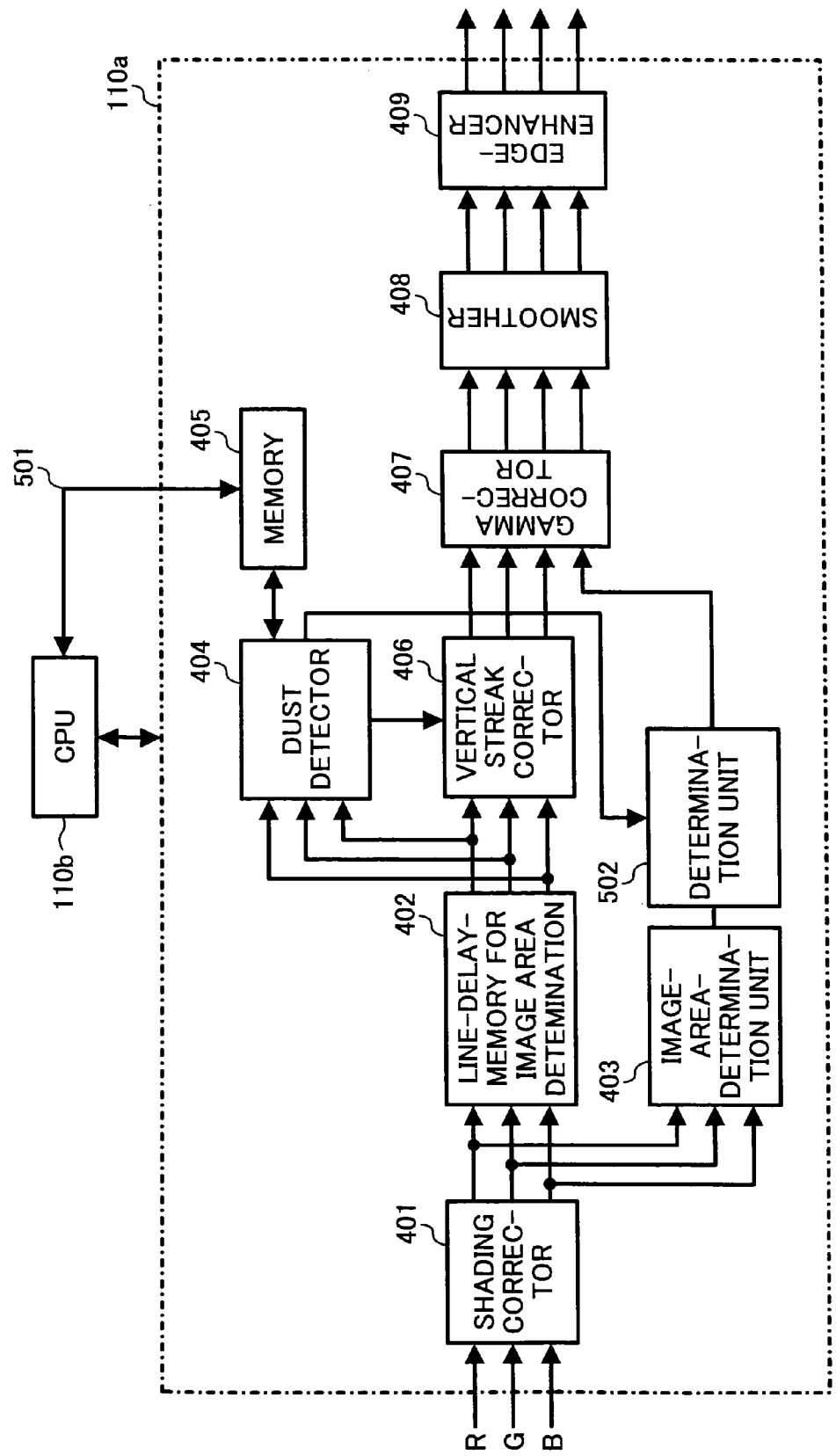
FIG. 4 is a block diagram of units related to SDF correction in an instruction processing unit (IPU)

FIG. 4 is a block diagram of units related to SDF correction in the IPU 110a. Processing for the SDF correction is performed by a shading corrector 401, a line-delay memory for image area determination 402, a vertical-streak corrector 406 serving as a correcting unit, a gamma corrector 407, a smoother 408, and an edge enhancer 409 serving as an edge enhancing unit in this order. The gamma corrector 407, the smoother 408, and the edge enhancer 409 form an image processing unit. As a switching signal for the vertical-streak corrector 406, a one-bit signal for dust detection ON/OFF, which is a dust detection result of a dust detector 404 serving as a dirty place-detecting unit and a dirty place-position-detecting unit described later, is used. An image-area determination unit 403 is provided in parallel with the line-delay memory for image area determination 402. The image-area determination unit 403 switches image processing in the gamma corrector 407, the smoother 408, and the edge enhancer 409 according to whether an image area is a text area or a photo area. The photo area includes not only a photographic paper photograph like an ordinary photograph but also a print photograph like a halftone dot image for representing a picture with a group of dots as in newspapers.

Since the image-area determination unit 403 determines an image area based on image data of a plurality of lines, line synchronization for a result of the image-area determination unit 403 and a result of image processing is required. The line-delay memory for image area determination 402 performs the line synchronization.

The IPU 110a in this embodiment connects a data bus 501 for a dust detection result memory 405 directly to a CPU bus to read out data of the dust detection result memory 405, which stores a dust detection result of the dust detector 404, from the CPU 110b. Consequently, the CPU 110b is capable of directly treating the dust detection result and communicating information to the operation panel P.

The IPU 110a in this embodiment is mounted with a determination unit 502 to make it possible to correct an image area determination signal from the image-area determination unit 403 based on the dust detection result of the dust detector 404 and output the image area determination signal for image processing in the gamma corrector 407, the smoother 408, and the edge enhancer 409 at a later stage. This makes it possible to control processing that enhances image deterioration with dust data.

Figure 5:
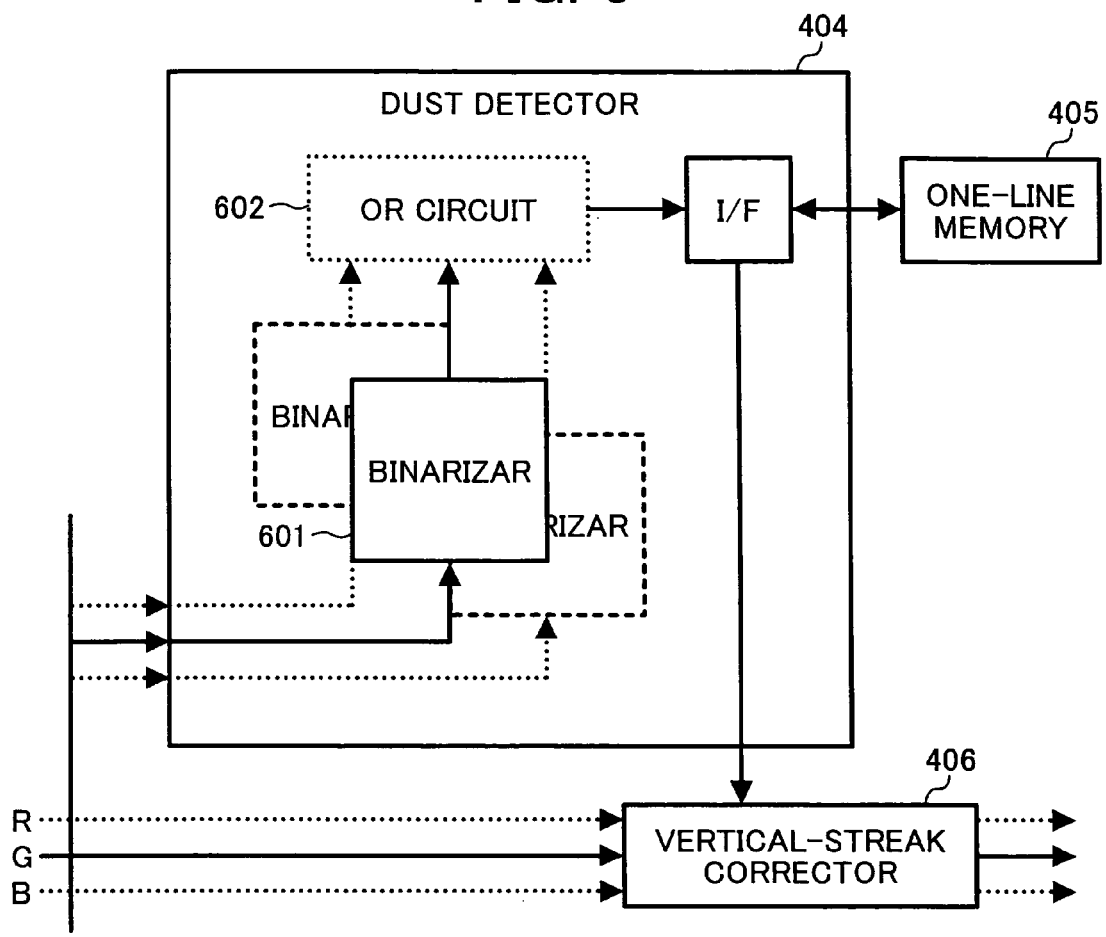
FIG. 5 is a block diagram of an internal structure of a dust detector.
Figure 6:
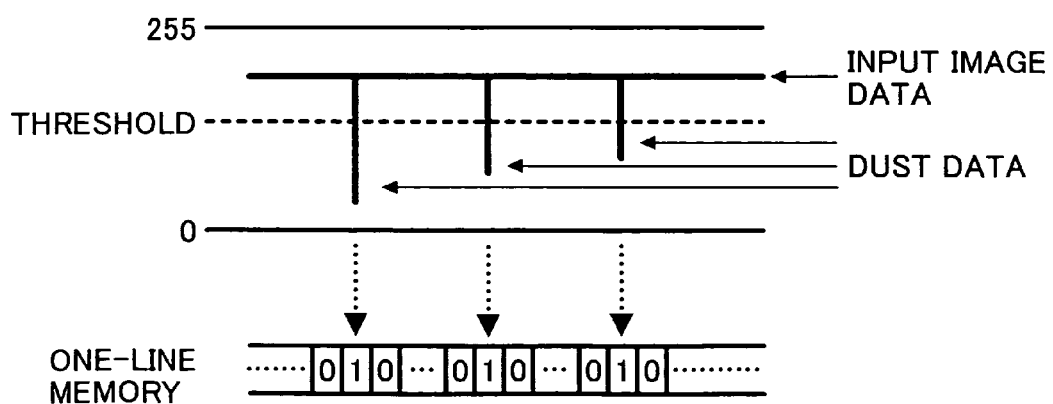
FIG. 6 is a diagram for explaining an example of written data in a dust detection result memory.

FIG. 5 is a block diagram of an internal structure of the dust detector 404. FIG. 6 is a diagram for explaining an example of written data in the dust detection result memory 405 serving as a one-line memory shown in FIG. 5. When the white sheet 26 of the guide member 23 is read by a scanning optical system before the original 50 is inserted onto the SDF original glass 29b (an image reading unit and a member reading unit), a portion without a dirty place such as dust or a scratch on the SDF original glass 29b is read as a white portion and a portion with a dirty place such as dust or a scratch is read as a black portion. Therefore, in the dust detector 404, first, input image data R, G, and B (in the case of a monochrome image, only G) are binarized by a binarizer 601 to generate one-bit data of white (0)/black (1). In the case of a color image, binarization results obtained by applying the binarization processing to R, G, and B, respectively, are outputted to an OR circuit 602. However, color streak is likely to occur and deterioration of an image quality is noticeable when the binarization results are corrected independently. Thus, OR of the binarization results of R, G, and B is calculated to write one-bit data in the dust detection result memory 405 (see FIG. 6).

Consequently, when the original 50 is inserted onto the SDF original glass 29b and read by the scanning optical system (the image reading unit and the original reading unit), the R, G, and B (in the case of a monochrome image, only G) image data are inputted to the vertical-streak corrector 406. The one-bit data written in the dust detection result memory 405 from the dust detector 404 is read out and inputted to the vertical-streak corrector 406.

Figure 7:
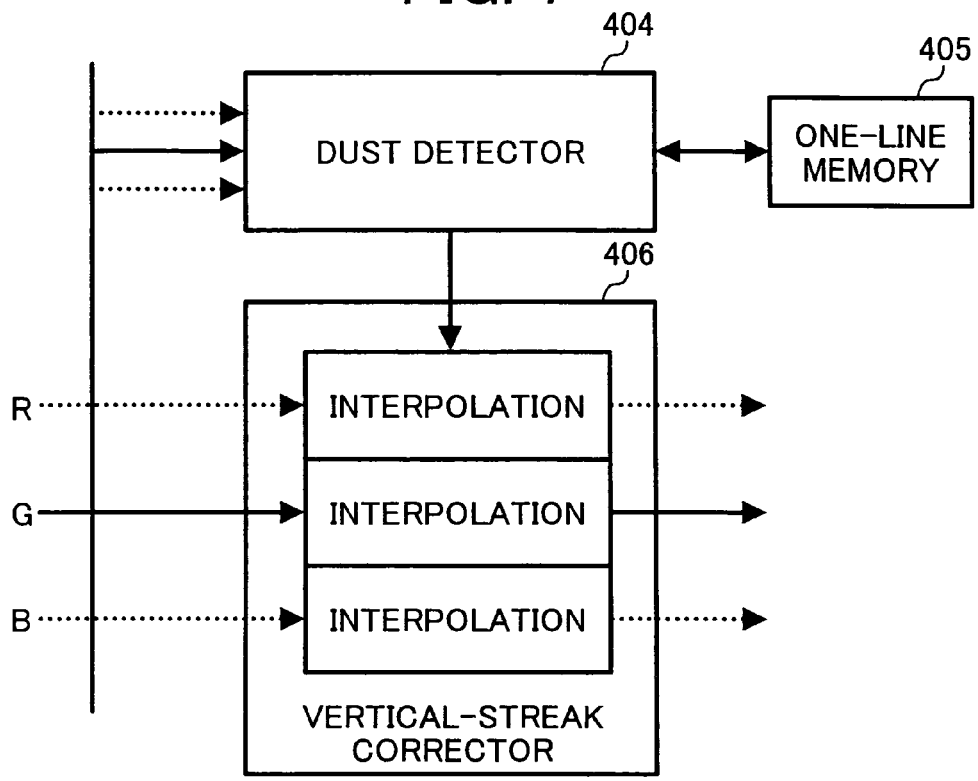
FIG. 7 is a block diagram of an internal structure of a vertical-streak corrector.
Figure 8:
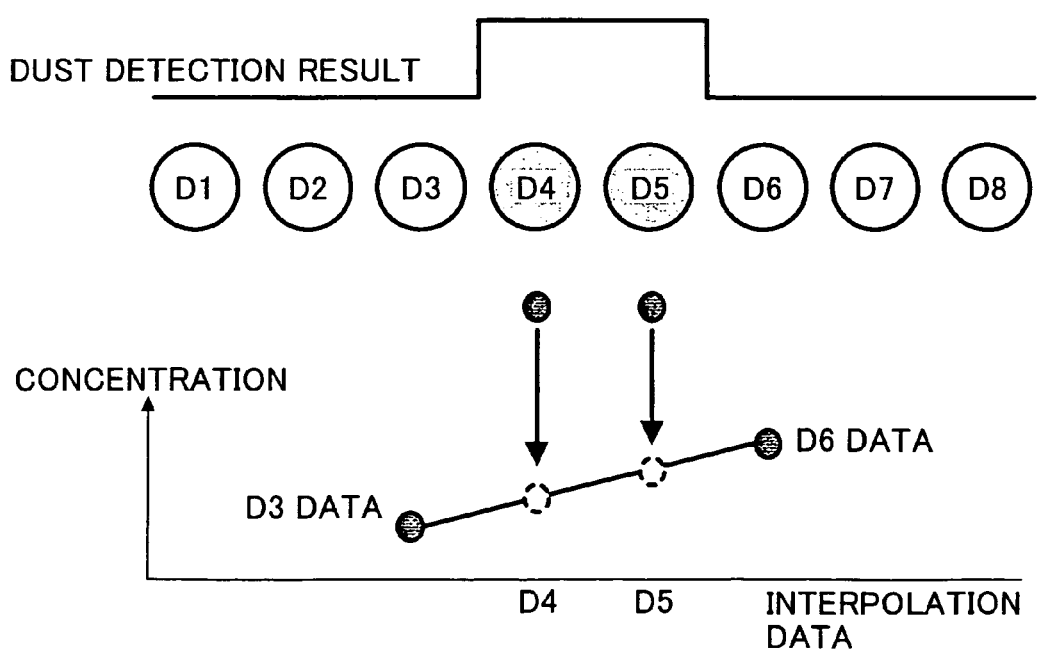
FIG. 8 is a diagram for explaining an example of correction processing of the vertical-streak corrector.

FIG. 7 is a block diagram of an internal structure of the vertical-streak corrector 406. FIG. 8 is a diagram for explaining an example of correction processing of the vertical-streak corrector 406. As shown in FIG. 7, original reading R, G, and B (in the case of a monochrome image, only G) image data are inputted to the vertical-streak corrector 406. In addition, a dust detection result is inputted to the vertical-streak corrector 406 from the dust detector 404. The vertical-streak corrector 406 executes interpolation processing.

As an interpolation processing method in the vertical-streak corrector 406, there is linear interpolation processing. As shown in FIG. 8, in the linear interpolation processing, when image data D4 and D5 are dust data, the image data D4 and D5 are outputted as a dust detection result. Therefore, the vertical-streak corrector 406 does not use the image data D4 and D5 and executes interpolation processing using image data D3 and D6 near the image data D4 and D5.

For example, in the case of an example shown in FIG. 8, an interpolation operation is performed as follows.

$$D4'=(D3\times2+D6\times1)/3$$

$$D5'=(D3\times1+D6\times2)/3$$

Figure 9:
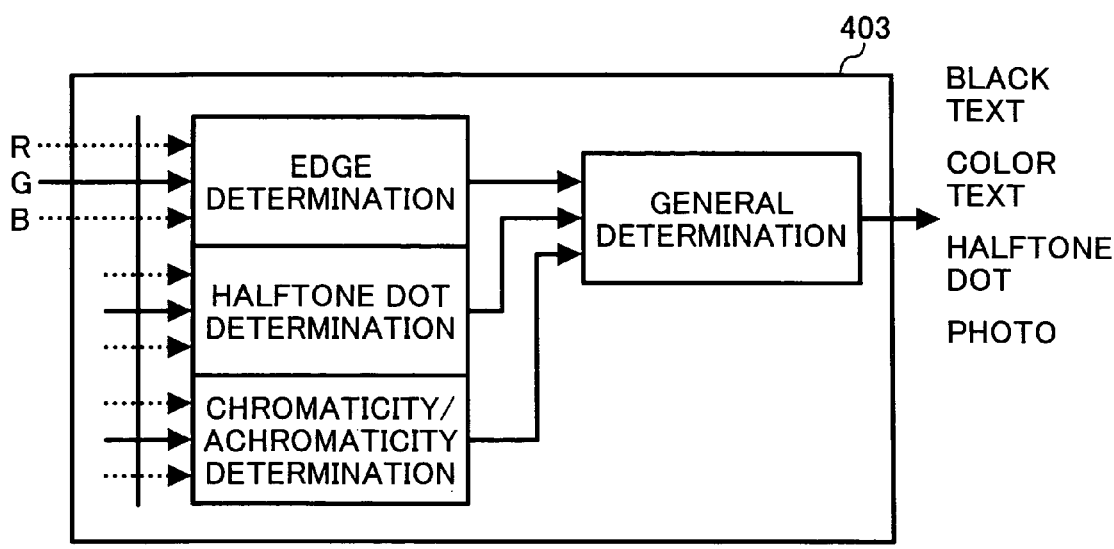
FIG. 9 is a block diagram of an internal structure of an image-area determination unit.

FIG. 9 is a block diagram of an internal structure of the image-area determination unit 403. The image-area determination unit 403 performs "edge determination", "halftone dot determination", and "chromaticity/achromaticity determination" based on inputted image R, G, and B data (in the case of a monochrome image, only G). According to three determination results, the image-area determination unit 403 performs "general determination" and divides the image into four image areas, a "black text", a "color text", a "halftone dot", and a "photo (others)".

In the "edge determination", the image-area determination unit 403 finds an area with a large change in concentration and sets the area as an edge candidate. In the "halftone dot determination", the image-area determination unit 403 binarizes inputted image data and performs pattern matching to judge whether an original has periodicity (whether an original is a halftone dot image) and sets an area with periodicity as a halftone dot candidate. In the "chromaticity/achromaticity determination", the image-area determination unit 403 checks balance of R, G, and B of the inputted R, G, and B image data. When a difference of the R, G, and B data is equal to or smaller than a predetermined threshold value, the image-area determination unit 403 sets an area with the difference as an achromaticity candidate. When the difference is equal to or larger than the predetermined threshold value, the image-area determination unit 403 sets an area with the difference as a chromaticity candidate. In the "general determination", the image-area determination unit 403 performs final determination based on the three candidates obtained by the "edge determination", the "halftone dot determination", and the "chromaticity/achromaticity determination".

For example, an area is determined as a "black text" in the "general determination" when the area is determined as an "edge" in the "edge determination", determined as a "non-halftone dot" in the "halftone dot determination", and determined as "achromatic" in the "chromaticity/achromaticity determination" ("black text=edge*non-halftone dot*achromaticity"). An area is determined as a "color text" in the "general determination" when the area is determined as an "edge" in the "edge determination", determined as a "non-halftone dot" in the "halftone dot determination", and determined as "chromatic" in the "chromaticity/achromaticity determination" ("color text=edge*non-halftone dot*chromaticity"). An area is determined as a "halftone dot" in the "general determination" when the area is determined as a "non-edge" in the "edge determination" and determined as a "halftone dot" in the "halftone dot determination" ("halftone dot=non-edge*halftone dot"). An area is determined as a "photo (others)" in the "general determination" when the area is determined as a "non-edge" in the "edge determination" and determined as a "non-halftone dot" in the "halftone dot determination" ("photo (others)=non-edge*non-halftone dot").

Figure 10:
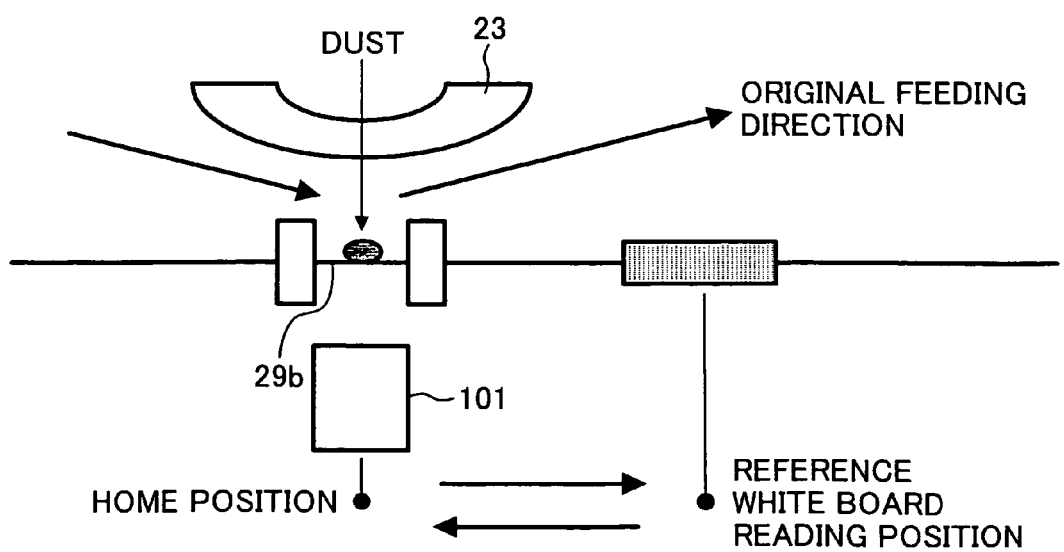
FIG. 10 is a diagram for explaining a structure of a section near an SDF original glass of an SDF.

FIG. 10 is a diagram for explaining a structure around the SDF original glass 29b of the SDF 1. FIG. 11 is a timing chart of operations at the time when an original is read by the SDF 1. Until the SDF 1 starts reading an original, the first carriage 101 including the lighting lamp 28 serving as a light source and the mirror 9 is located in a home position. When the copy start key of the operation panel P is depressed, the lighting lamp 28 is turned on (lamp on) and the first carriage 101 moves to a position for reading a reference white board for shading correction. Reference white board reading is executed (shading) and the first carriage 101 moves to the home position again (home position). Note that, in this embodiment, the white sheet 26 is stuck to the guide member 23 such that shading correction of the CCD 11 is performed by the white sheet 26. Therefore, the first carriage 101 may continue to be located in the home position. Thereafter, before the original 50 to be read is inserted onto the SDF original glass 29b, the white sheet 26 of the guide member 23 is read and a dust detection result is written in the dust detection result memory 405 (write dust detection in memory).

In the case of the scanner apparatus 100 in this embodiment, as described above, the CPU 110b reads the dust detection result memory 405, determines a dust position and an amount of dust, transfers information to the operation panel P, and displays a "maintenance note" or a "reading suspension/continuation message" on the display unit P2 of the operation panel P (CPU read and operation panel display). Subsequently, when continuation of reading is selected, the original 50 to be read is inserted onto the SDF original glass 29b (original insertion) to make image data effective (FGATE).

Figure 13:
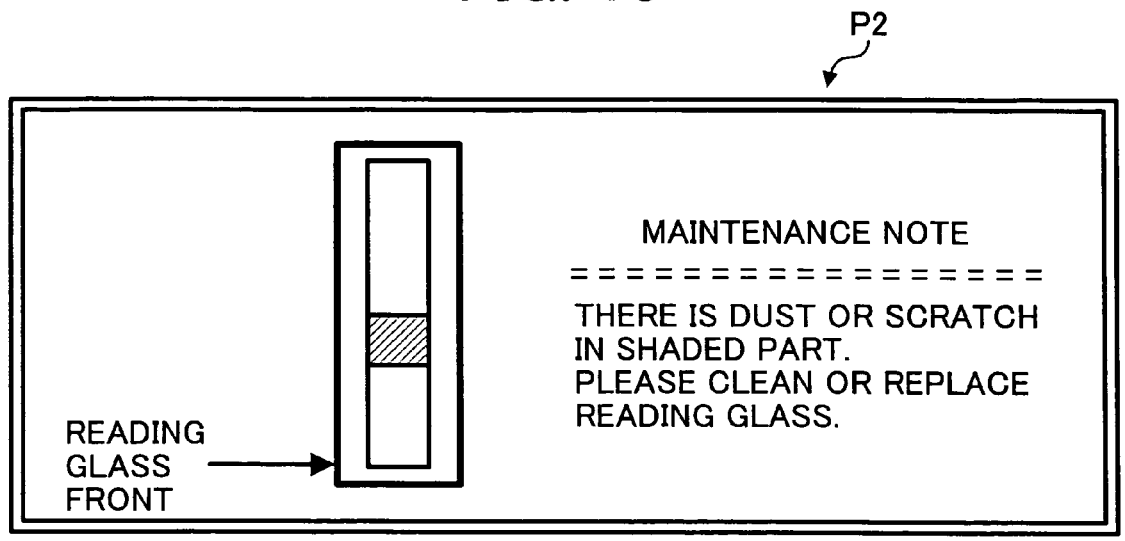
FIG. 13 is a front view of an example of display of a maintenance note.
Figure 14:
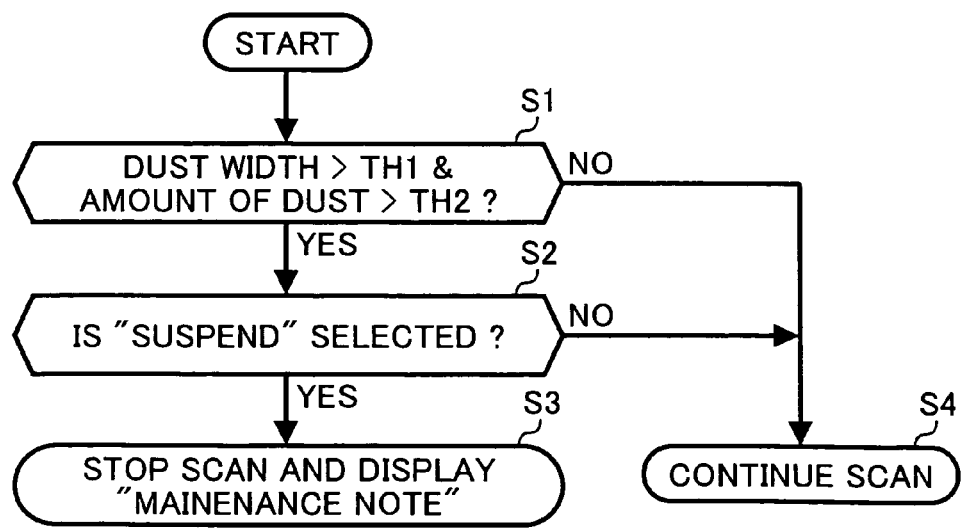
FIG. 14 is a flowchart of a flow of processing at the time when a maintenance note is displayed.

For example, the CPU 110b reads the dust detection result memory 405 and determines a dust position and an amount of dust. When a determination result indicated by FIG. 12 is obtained, the CPU 110b determines that dust data is concentrated further on a front side than a reading center, suspends the original reading, and displays a maintenance note shown in FIG. 13 on the display unit P of the operation panel P. FIG. 12 indicates a pulse position for detecting a position of dust. When it is determined that dust is present on the SDF original glass 29b, a pulse signal is detected. For example, an abscissa in FIG. 12 indicates a position on the SDF original glass 29b. When a pulse signal (1) is detected, the CPU 110b determines that dust is present in a position where the pulse signal (1) is detected and displays the maintenance note shown in FIG. 13 on the display unit P2 of the operation panel P. It is possible to specify a position where image deterioration is caused and facilitate maintenance by informing (displaying) a position of dust or a scratch detected in this way. As a result, a dirty place-position-informing unit is realized.

Figure 15:
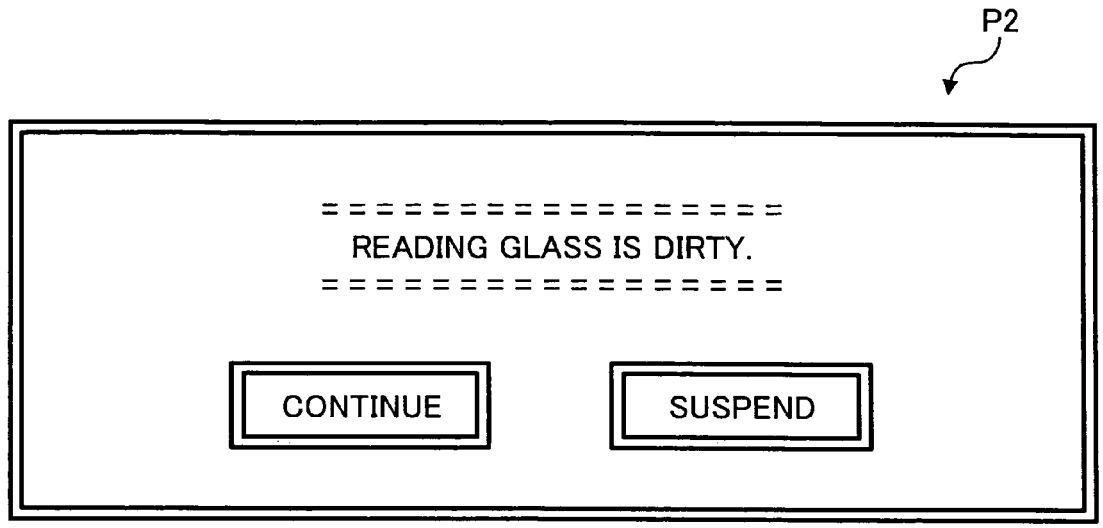
FIG. 15 is a front view of an example of display for requesting a user to select whether original reading should be continued or suspended when glass is dirty.

The CPU 110b reads the dust detection result memory 405 and stores dust data for one line in a work memory of the CPU 110b. Then, the CPU 110b performs processing for determining a dust position and an amount of dust. When a dust width is larger than TH1 and an amount of dust is larger than TH2 as a result of the determination ("Yes" at step S1: a determination unit), the CPU 110b displays a screen shown in FIG. 15 on the display unit P2 of the operation panel P to indicate that the SDF original glass 29b is dirty. The CPU 110b requests a user to select whether the original reading should be continued or suspended (step S2: an informing unit and a selection request unit). When the user selects a "suspend" key on the screen in FIG. 15 displayed on the operation panel P ("Yes" at step S2), the CPU 110b stops the original reading and discharges the original 50. The CPU 110b displays a "maintenance note" indicating to that effect on the operation panel P (step S3). When a "continue" key is selected ("No" at step S2), the CPU 110b continues scan (step S4) and starts original reading processing directly. When a dust width is not larger than TH1 and an amount of dust is not larger than TH2 as a result of the determination in the processing for determining a dust position and an amount of dust ("No" at step S1), the CPU 110b continues the scan (step S4) and starts the original reading processing directly.

As described above, the scanner apparatus 100 reads the original 50 using the SDF 1 and converts read image information into a digital image signal. The scanner apparatus 100 has the dust detection result memory 405 that stores at least one line of data of a space between a surface of an original and an original reading element. The scanner apparatus 100 reads out the data stored in the dust detection result memory 405, determines a position of dust or a scratch from the data read out, and automatically selects suspension, continuation, or stop of the reading. This makes it possible to reduce image processing that enhances the dust and increase deterioration of an image quality. The scanner apparatus 100 displays the position on the display unit P2 of the operation panel P. This makes it possible to specify positions where dust is present and provide an environment in which maintenance for the scanner apparatus 100 is facilitated.

Figure 16:
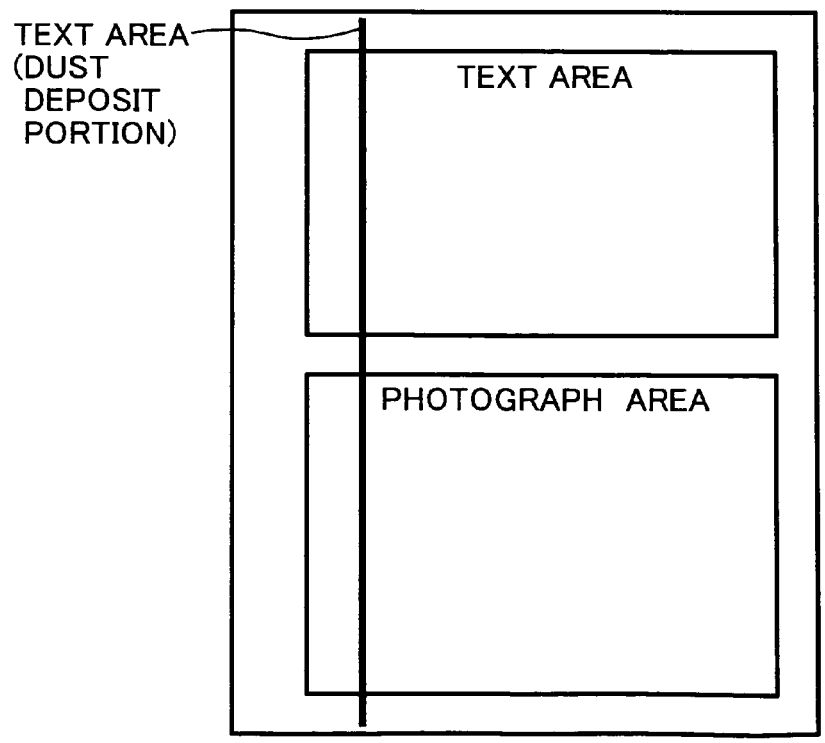
FIG. 16 is a diagram for explaining a determination result of the image-area determination unit.

In the determination of the image-area determination unit 403, since a vertical streak correction result of the vertical-streak corrector 406 is not used and original reading data is used, when dust deposits on the SDF original glass 29b, a clear black line (or color line) appears on an image. As a result, as shown in FIG. 16, a portion where the dust deposits is also determined as a character. The image-area determination unit 403 outputs an image area determination signal indicating that the portion where the dust deposits is also determined as a character. Therefore, a vertical streak due to the dust is clearly enhanced by image processing of the gamma corrector 407 and the subsequent image processing. To prevent the streak from being enhanced, when a dust detection result from the dust detector 404 indicates presence of dust, a value corresponding to an image area determination signal from the image-area determination unit 403 is not used and a fixed value (an edge enhancement control value) designated by the determination unit 502 is used (an edge-enhancement-control unit and an image-area-determination-correcting unit). Note that the fixed value (the edge enhancement control value) may be provided in a plurality of stages for edge enhancement.

Figure 17:
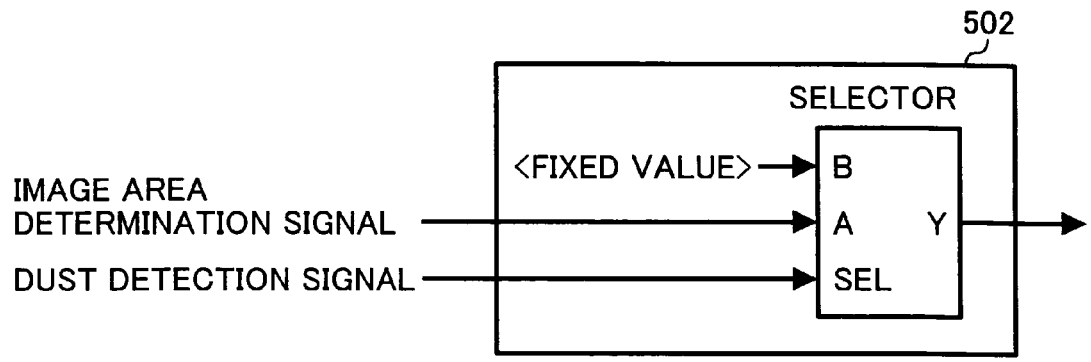
FIG. 17 is a block diagram of an internal structure of a determination unit.

More specifically, as shown in FIG. 17, the determination unit 502 receives a signal indicating presence of dust according to a result of dust detection (a dirt detection signal) from the dust detector 404 (a dirt-detection-signal-receiving unit) and receives an image area determination signal indicating a text area from the image-area determination unit 403 (an image-area-determination-signal-receiving unit). The determination unit 502 performs switching of output to cause the gamma corrector 407, the smoother 408, and the edge enhancer 409. The determination unit 502 outputs a fixed value (an edge enhancement control value) to an area, which overlaps a dirty place indicated by the received dirt detection signal, in a text area indicated by the received image area determination signal (an image-area-determination-correcting unit). The fixed value is designated in advance for controlling edge enhancement compared with the text area. Therefore, in the image processing in the gamma corrector 407 and the subsequent image processing, image processing, which does not use the image area determination signal and uses the fixed value (the edge enhancement control value), is applied to the area, which overlaps the dirty place indicated by the received dirt detection signal, in the text area indicated by the received image area determination signal. This makes it possible to perform image processing in which enhancement of a portion of a vertical streak due to dust is controlled.

Figure 18:
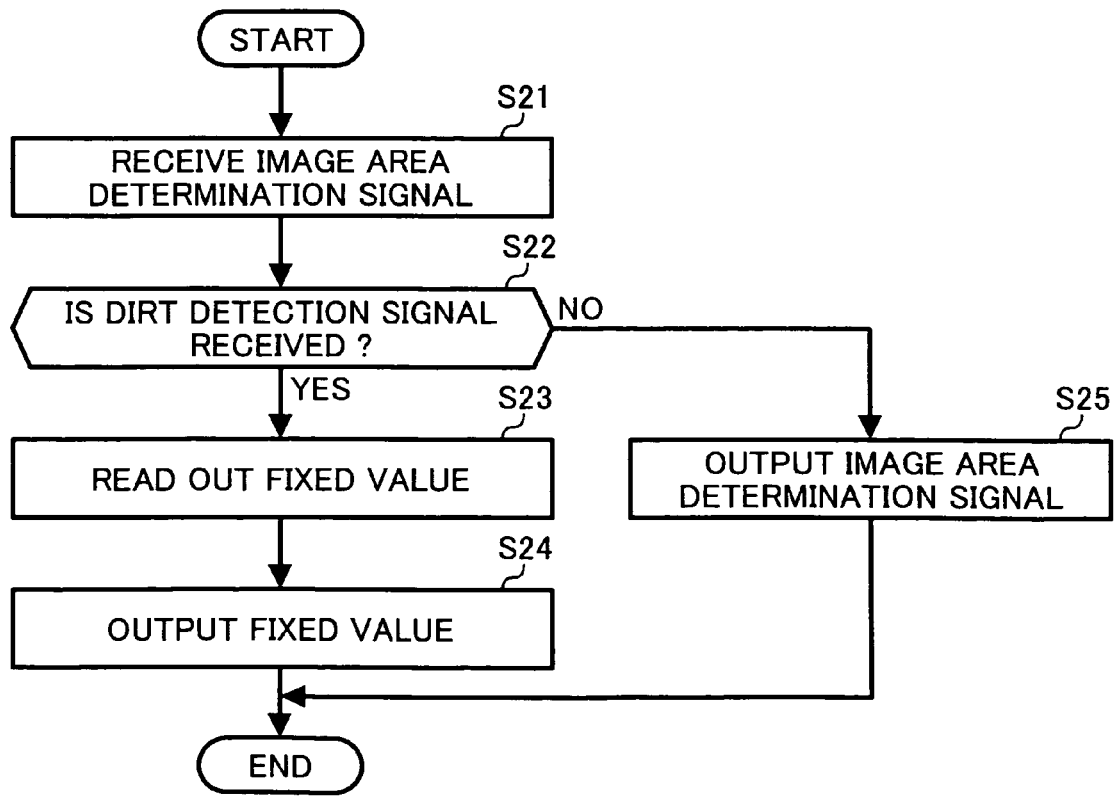
FIG. 18 is a flowchart of a flow of processing in the determination unit.

FIG. 18 is a flowchart of a flow of processing in the determination unit 502. The determination unit 502 receives an image area determination signal indicating a text area from the image-area determination unit 403 (step S21). When the determination unit 502 receives a signal indicating that dust is present according to a result of dust detection (a dirt detection signal) from the dust detector 404 ("Yes" at step S22), the determination unit 502 reads out the fixed value (the edge enhancement control value) designated in advance for controlling edge enhancement compared with the text area (step S23). The determination unit 502 outputs the fixed value (the edge enhancement control value) to an area, which overlaps a dirty place indicated by the received dirt detection signal, in the text area indicated by the received image area determination signal (step S24). On the other hand, the determination unit 502 directly outputs the received image area determination signal to an area, which does not overlap the dirty place indicated by the received dirt detection signal, in the text area indicated by the received image area determination signal (step S25).

In FIG. 19, a value for causing the edge enhancer 409 to perform edge enhancement of the same degree as relatively controlled edge enhancement applied to an image in an area determined as a photo area (i.e., an image area determination signal at the time when an area is determined as a photo area) is outputted as the fixed value (the edge enhancement control value). As shown in FIG. 19, when it is determined that no dust is present according to a result of dust detection from the dust detector 404, a dirt detection signal is 0. In this case, the determination unit 502 uses an image area determination signal outputted from the image-area determination unit 403. Therefore, output image data similar to input image data is generated in image processing of the gamma corrector 407 and the subsequent image processing.

A relation between correction by the vertical-streak corrector 406 and correction of an image area determination signal from the image-area determination unit 403 in this case is explained. FIG. 20A is a diagram for explaining a state in which correction processing is not performed when the image data D4 and D5 are dust data.

Figure 20B:
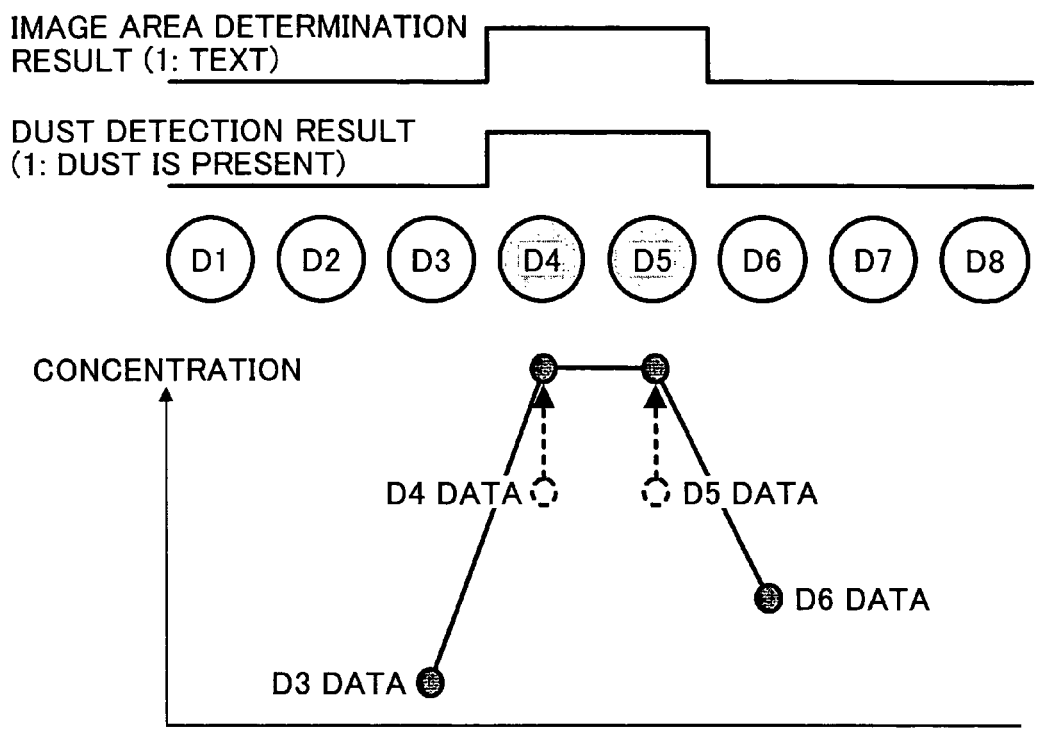
FIG. 20B is a diagram for explaining a state in which correction is not performed by a vertical-streak corrector and an image area determination signal outputted from the image-area determination unit is outputted without being changed to an image area determination signal that is obtained by photo determination in the determination unit.

In FIG. 20B, it is determined that dust is present according to a result of dust detection from the dust detector 404. Correction is not performed by the vertical-streak corrector 406 and an image area determination signal outputted from the image-area determination unit 403 is outputted without being changed to an image area determination signal that is obtained by photo determination in the determination unit 502. In this case, the dust data D4 and D5 are further enhanced and a portion of vertical streak due to the dust is enhanced.

Figure 20C:
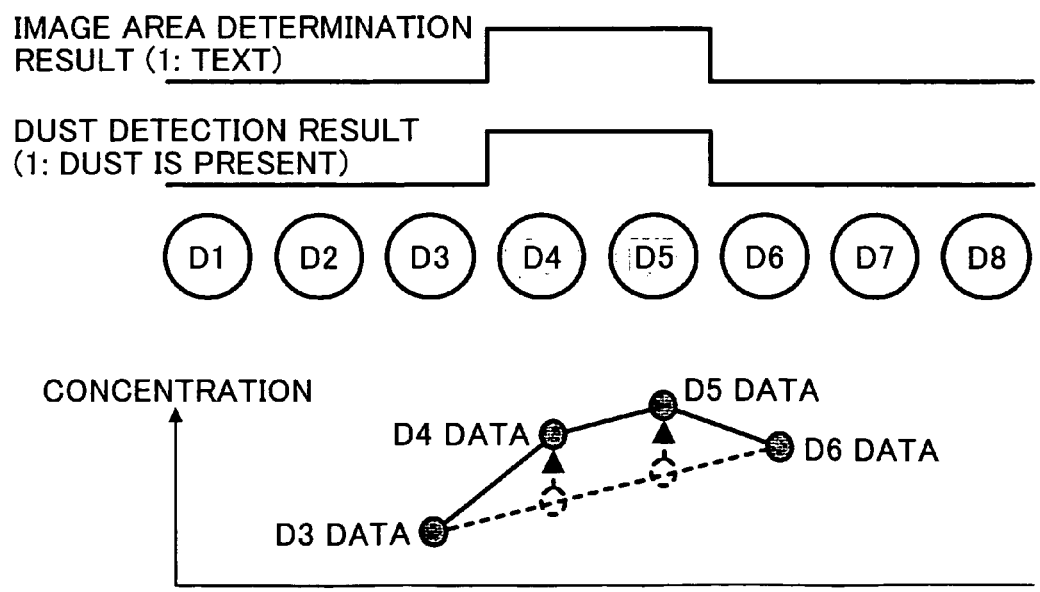
FIG. 20C is a diagram for explaining a state in which correction is performed by the vertical-streak corrector and an image area determination signal outputted from the image-area determination unit is outputted without being changed to an image area determination signal that is obtained by photo determination in the determination unit.

In FIG. 20C, it is determined that dust is present according to a result of dust detection from the dust detector 404. Correction is performed by the vertical-streak corrector 406 and an image area determination signal outputted from the image-area determination unit 403 is outputted without being changed to an image area determination signal that is obtained by photo determination in the determination unit 502. In this case, concentration of the dust data D4 and D5 is slightly higher than that of other data because of a difference in intensity but there is no significant influence due to the dust.

Figure 20D:
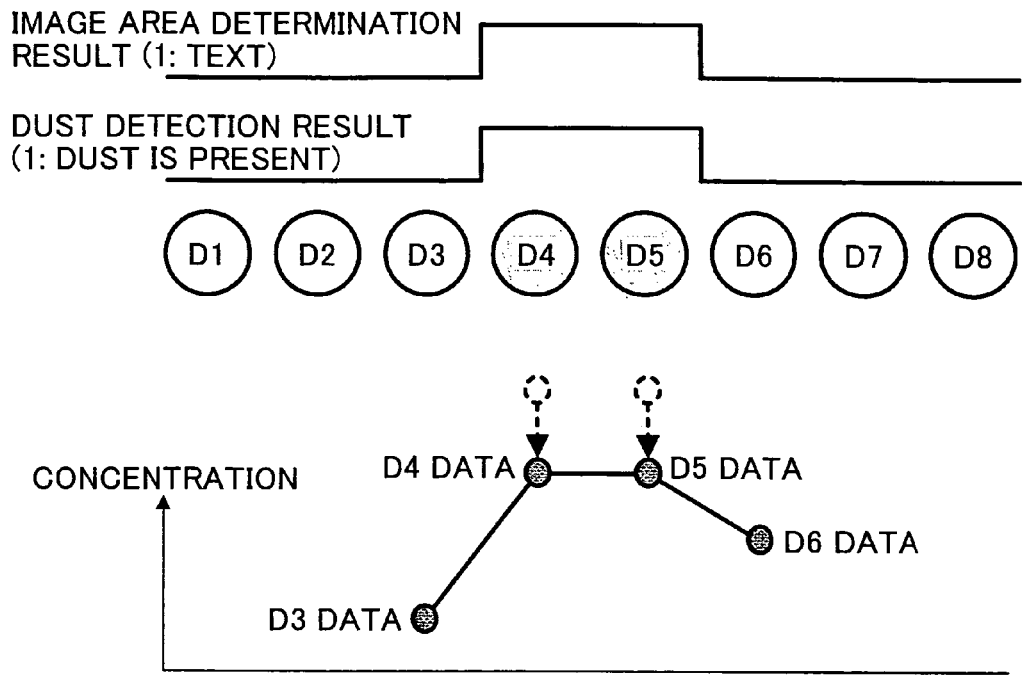
FIG. 20D is a diagram for explaining a state in which correction is not performed by the vertical-streak corrector and an image area determination signal outputted from the image-area determination unit is outputted after being changed to an image area determination signal that is obtained by photo determination in the determination unit.

In FIG. 20D, it is determined that dust is present according to a result of dust detection from the dust detector 404. Correction is not performed by the vertical-streak corrector 406 and an image area determination signal outputted from the image-area determination unit 403 is outputted after being changed to an image area determination signal that is obtained by photo determination in the determination unit 502. In this case, since smoothing is performed without correction, there is no significant influence of the dust if concentration of the dust is low. In other words, this processing is effective for small dust.

Figure 20E:
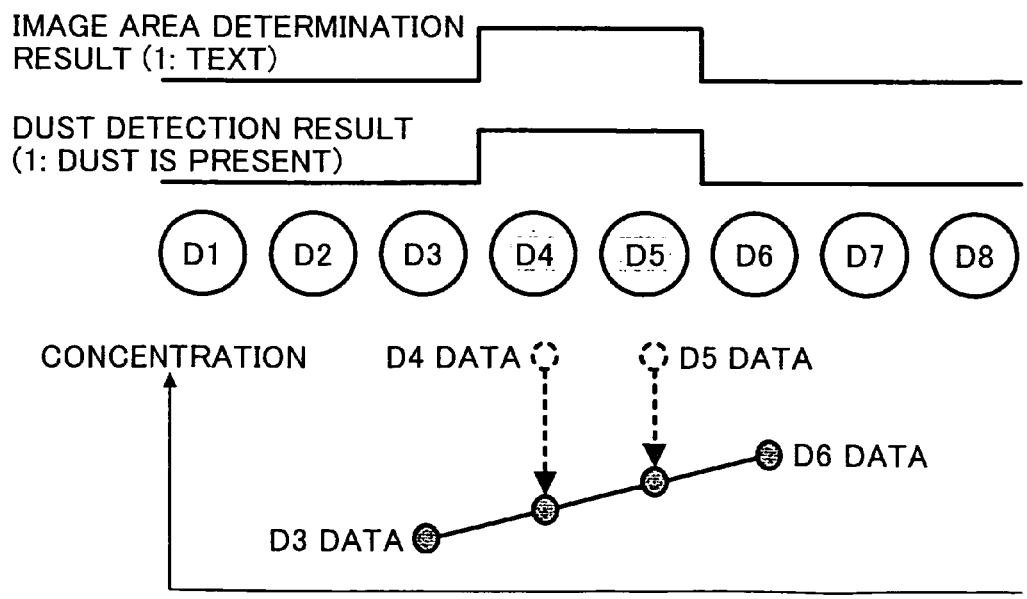
FIG. 20E is a diagram for explaining a state in which correction is performed by the vertical-streak corrector and an image area determination signal outputted from the image-area determination unit is outputted after being changed to an image area determination signal that is obtained by photo determination in the determination unit.

In FIG. 20E, it is determined that dust is present according to a result of dust detection from the dust detector 404. Correction is performed by the vertical-streak corrector 406 and an image area determination signal outputted from the image-area determination unit 403 is outputted after being changed to an image area determination signal that is obtained by photo determination in the determination unit 502. In this case, it is possible to control enhancement of a portion of streak due to the dust.

As described above, according to this embodiment, when a dirty place detected by the dust detector 404 is determined as a text area by the image-area determination unit 403, edge enhancement for the dirty place by the edge enhancer 409 is controlled. Consequently, it is possible to control enhancement of an image for a dirty place on a reading glass that causes deterioration of an image. Thus, it is possible to perform correction processing for deterioration of an image without requiring an additional mechanism.

According to this embodiment, in a state in which the original 50 is not conveyed on the conveyance path 2c, dust, a scratch, or the like of the SDF original glass 29b is detected based on image data of the guide member 23 read by the scanning optical system. In addition, a position of the detected dust or scratch on the SDF original glass 29b is detected. Image area determination is applied to original image data obtained by reading the original 50, which is conveyed by the SDF 1, with the scanning optical system. Concerning the position of the dust or the scratch in the original image data, an image area determination result is not used and an image area determination result designated in advance, which controls enhancement of the dust or the scratch, is outputted. Image processing corresponding to an image area determination result after correction is applied to the original image data. Consequently, it is possible to control enhancement of an image of dust or a scratch on the SDF original glass 29b that causes deterioration of an image. Thus, it is possible to perform correction processing for deterioration of an image without requiring additional mechanism.

Note that, although the example of application of the SDF original glass 29b as the reading glass is explained, the original table 2a may be applied as the reading glass. When the original table 2a is applied as the reading glass, the original pressing member, which is the white resin sheet, is read by the scanning optical system in the original stationary mode before the original 50 is placed on the original table 2a. The dust detector 404 detects a dirty place such as dust or a scratch on the original table 2a. When the dirty place detected by the dust detector 404 is determined as a text area by the image-area determination unit 403, edge enhancement on the dirty place by the edge enhancer 409 is controlled.

In a second embodiment of the present invention to be explained below with reference to FIGS. 21 to 29, components same as those in the first embodiment are denoted by the same reference numerals and signs and explanations of the components are omitted. In this embodiment, a scanner apparatus can use a belt-type SDF in addition to the roller-type SDF 1 explained in the first embodiment. The second embodiment is different from the first embodiment in that the structure of the dust detector 404 is changed taking into account processing for switching the belt-type SDF and the roller-type SDF.

Figure 21:
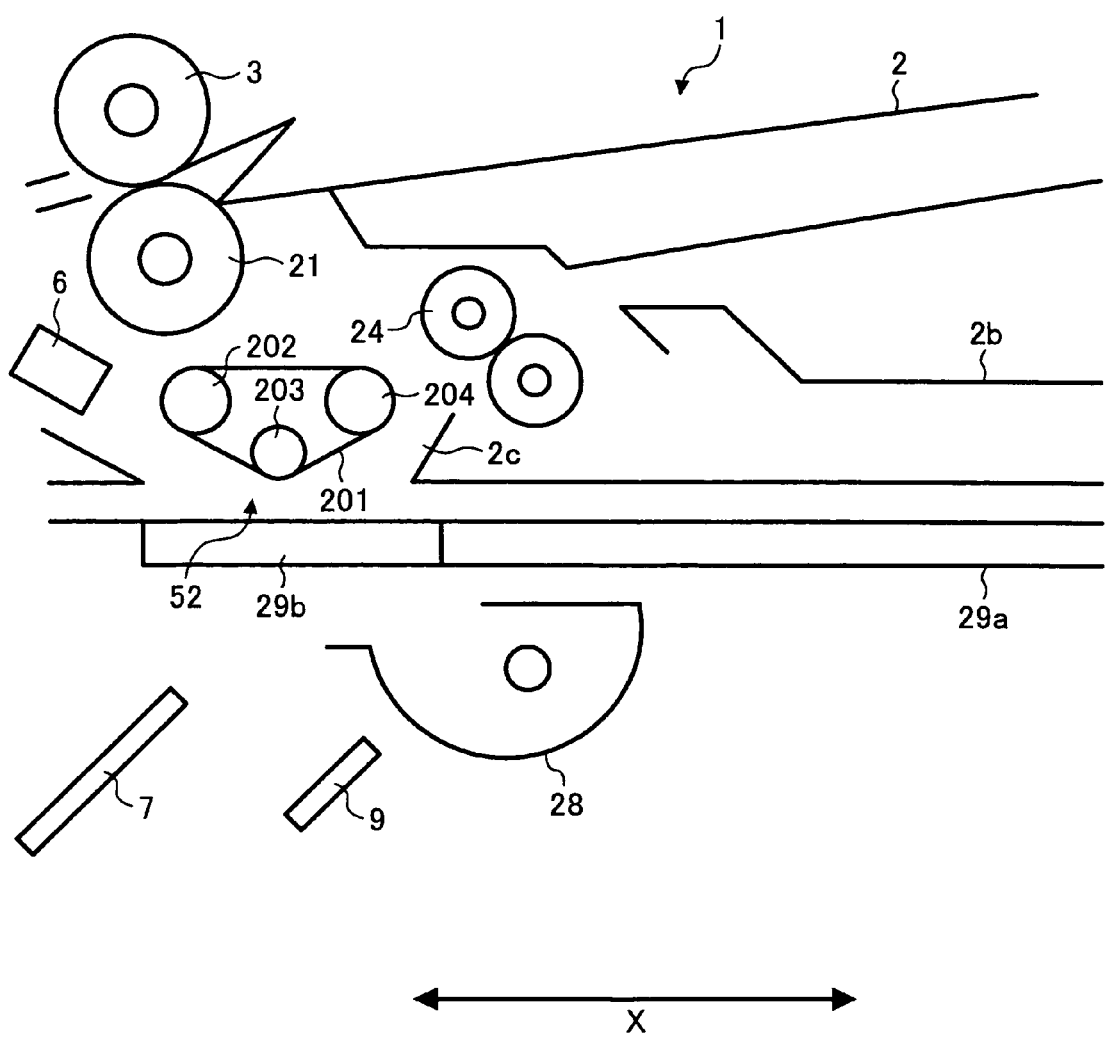
FIG. 21 is a longitudinal sectional side view of a belt-type SDF according to a second embodiment of the present invention.
Figure 22:
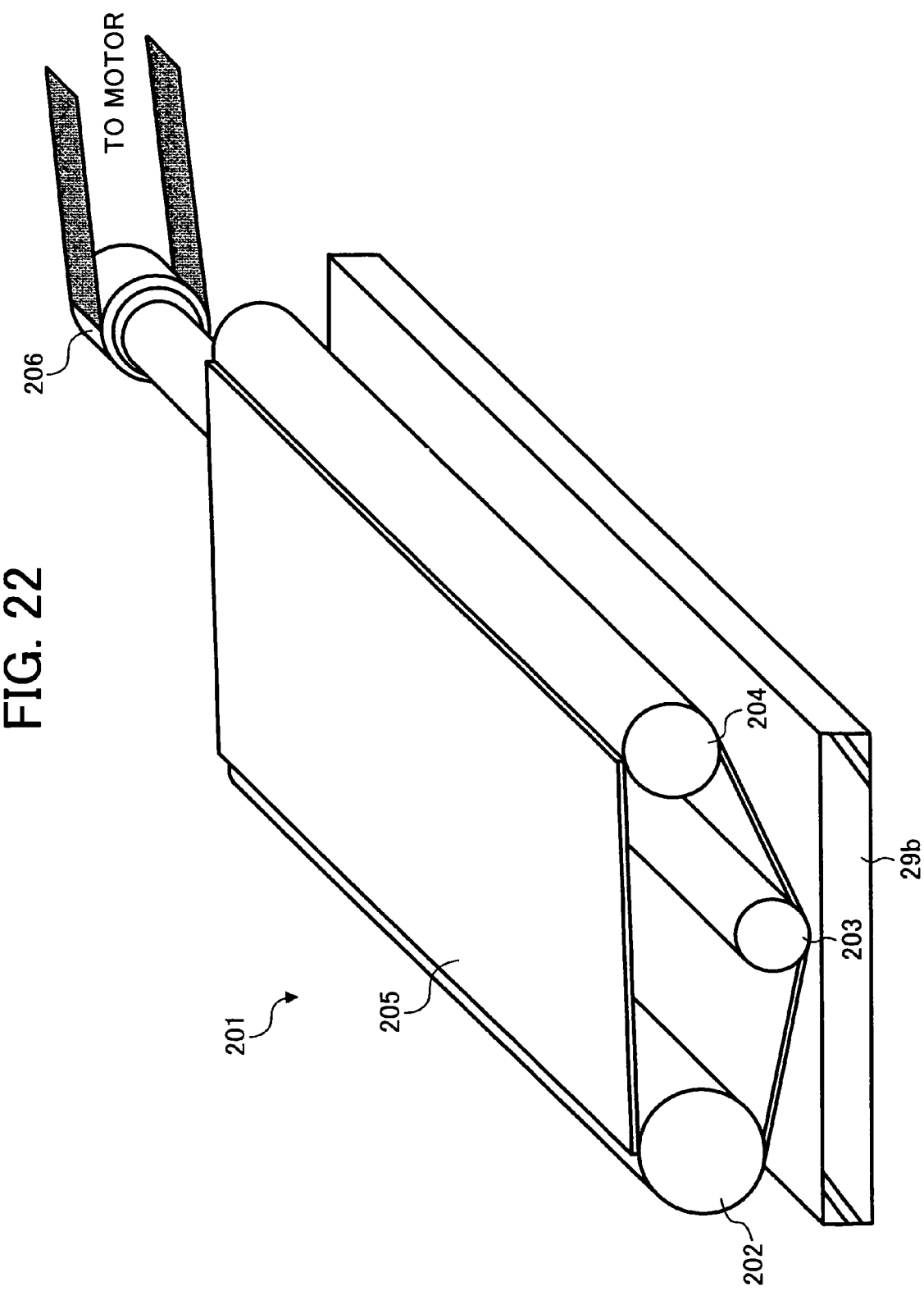
FIG. 22 is an enlarged perspective view of a conveyor belt unit.

FIG. 21 is a longitudinal sectional side view of a belt-type SDF 200 according to the second embodiment. FIG. 22 is an enlarged perspective view of a conveyor belt unit 201. As shown in FIG. 21, the belt-type SDF 200 includes the conveyor belt unit 201 instead of the guide member 23 of the SDF 1 in the first embodiment. The conveyor belt unit 201 serves as a conveyance-path-forming member forming a part of the conveyance path 2c and also serves as a sheet conveying unit that conveys the original 50 in a predetermined sheet feeding direction.

The conveyor belt unit 201 includes a drive roller 202 that is driven to rotate by a not-shown motor, two rollers of a pressure roller 203 and a housing (not shown) that supports the two rollers, a driven roller 204 and a bracket (not shown) that supports the driven roller 204, a substantially white conveyor belt 205 that is wound around the drive roller 202, the pressure roller 203, and the driven roller 204, and a pressure spring (not shown) that presses the driven roller 204. The drive roller 202 is arranged most upstream, the pressure roller 203 not having a drive force is arranged downstream the drive roller 202, and the driven roller 204 is arranged most downstream. The drive roller 202, the pressure roller 203, and the driven roller 204 always have the same positional relation with the housing (although the drive roller 202, the pressure roller 203, and the driven roller 204 rotate). A gap between the drive roller 202, the pressure roller 203, and the driven roller 204 is the narrowest in a position right below the pressure roller 203. The gap is kept at 0.3 millimeter to 0.5 millimeter. The drive roller 202 is connected to the motor via one-way clutch 206. An attachment direction of the one-way clutch 206 is a direction in which the conveyor belt 205 rotates in an original conveyance direction when the motor is driven to rotate normally (a direction in which the one-way clutch 206 idles and the conveyor belt 205 rotates when the conveyor belt 205 is rotated in the original conveyance direction). Consequently, the conveyor belt 205 rotates following the rotation of the drive roller 202 that is driven to rotate by the motor.

An original reading position and the like around the SDF original glass 29b of the belt-type SDF 200 are the same as those in the roller-type SDF 1 shown in FIG. 10. The belt-type SDF 200 is different from the roller-type SDF 1 only in a position of a reference white board and in that the conveyor belt 205 is provided instead of the guide member 23.

Figure 23:
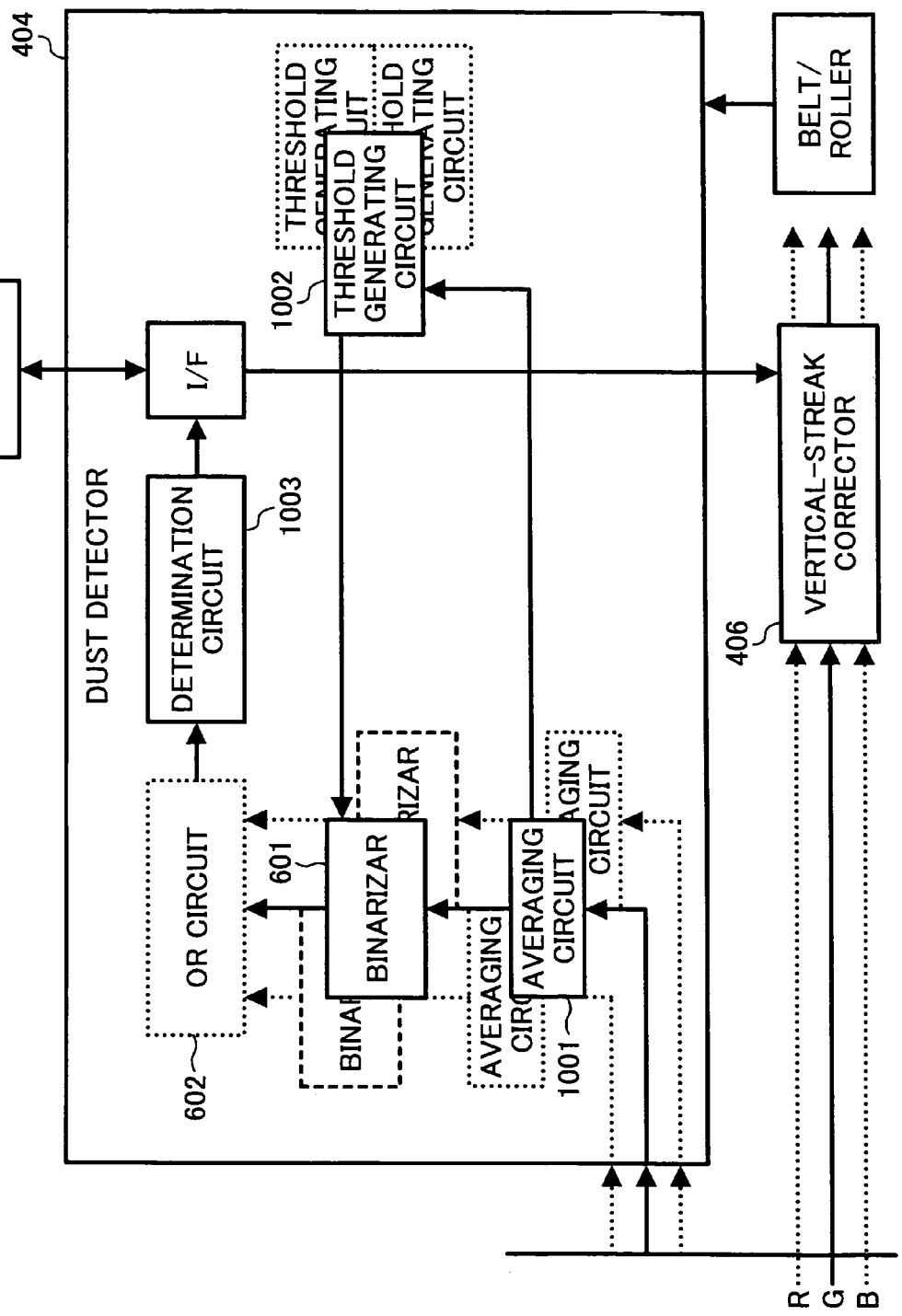
FIG. 23 is a block diagram of an internal structure of a dust detector.

FIG. 23 is a block diagram of an internal structure of the dust detector 404 in this embodiment. As shown in FIG. 23, in addition to the components of the dust detector 404 in the first embodiment, the dust detector 404 in this embodiment includes an averaging circuit 1001 that calculates an average value from R, G, and B data to be inputted, a threshold generating circuit 1002 that generates a threshold value and sends the threshold value to the binarizer 601 in response to a signal from the averaging circuit 1001, and a determination circuit 1003 that finally determines whether ON/OFF bits of dust data should be written in the dust detection result memory 405 serving as a one-line memory.

Figure 24:
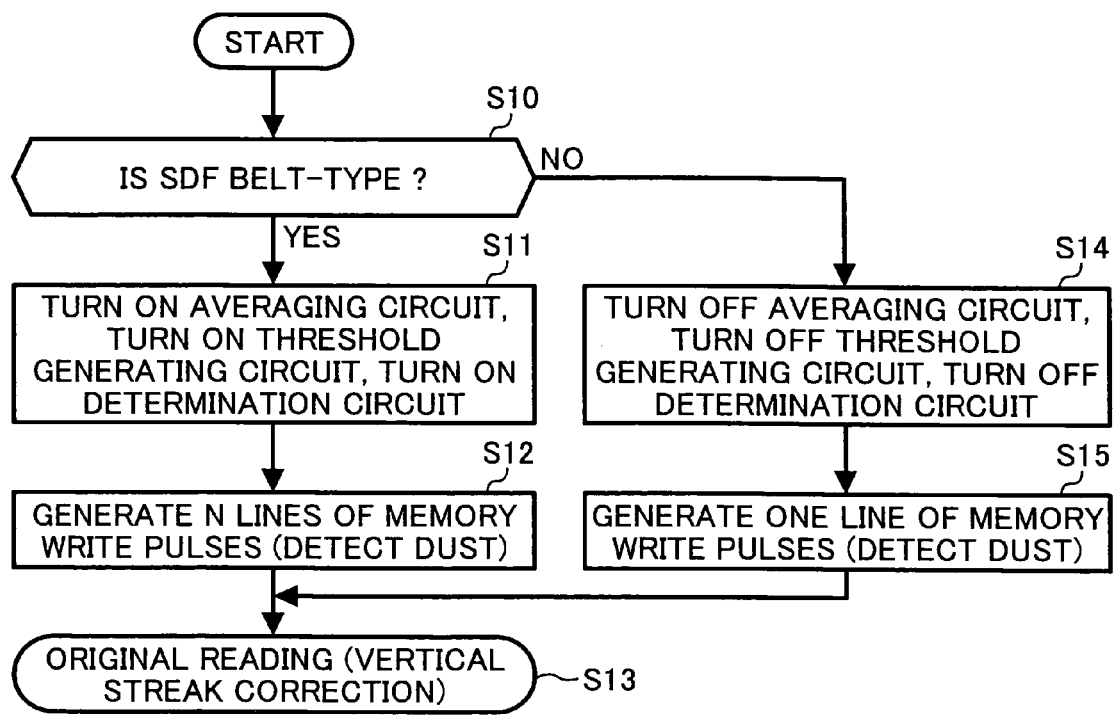
FIG. 24 is a flowchart of a flow of original reading processing.

In a processing operation for reading an original shown in FIG. 24, the scanner apparatus 100 determines whether an SDF is a belt-type SDF (step S10). When it is judge that the SDF is a belt-type SDF ("Yes" at step S10), the scanner apparatus 100 turns on the averaging circuit 1001, the threshold generating circuit 1002, and the determination circuit 1003 shown in FIG. 23, which are mounted on the dust detector 404 anew (step S11). The scanner apparatus 100 performs generation of N lines of memory write pulses (dust detection) (step S12) and performs original reading (vertical streak correction) (step S13).

When it is determined that the SDF is not a belt-type SDF ("No" at step S10), the scanner apparatus 100 determines that the SDF is a roller-type SDF and turns off the averaging circuit 1001, the threshold generating circuit 1002, and the determination circuit 1003 (step S14). The scanner apparatus 100 performs generation of one line of memory write pulses (dust detection) (step S15) and performs original reading (vertical streak correction) (step S13).

In this way, the scanner apparatus 100 uses the averaging circuit 1001, the threshold generating circuit 1002, and the determination circuit 1003 when the SDF is the belt-type SDF 200 and turns off the averaging circuit 1001, the threshold generating circuit 1002, and the determination circuit 1003 when the SDF is the roller-type SDF 1.

Figure 25:
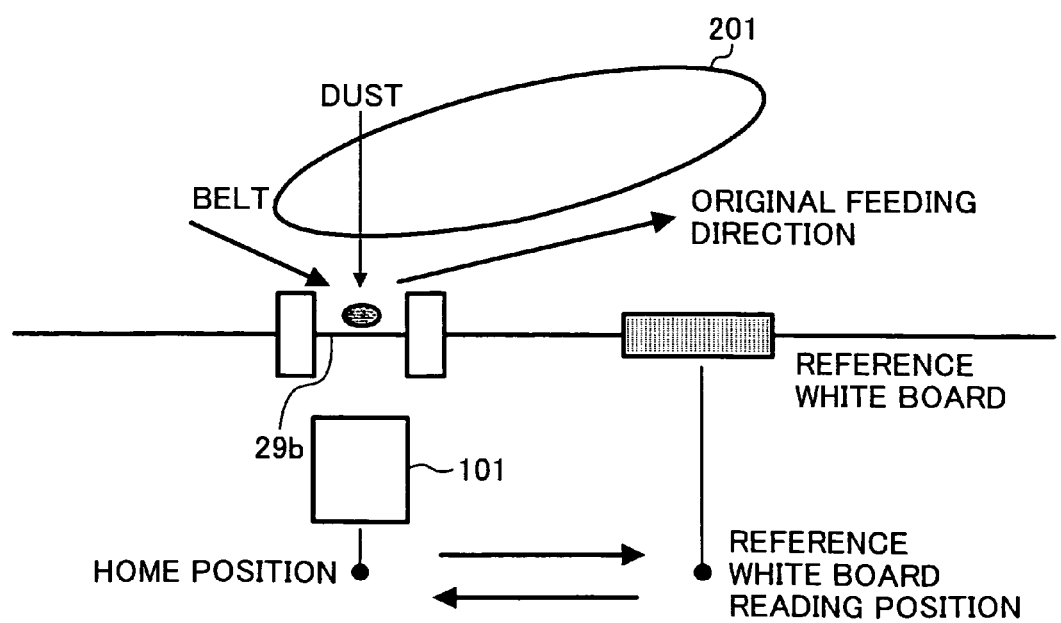
FIG. 25 is a diagram for explaining a structure around an SDF original glass of the belt-type SDF.
Figure 26:
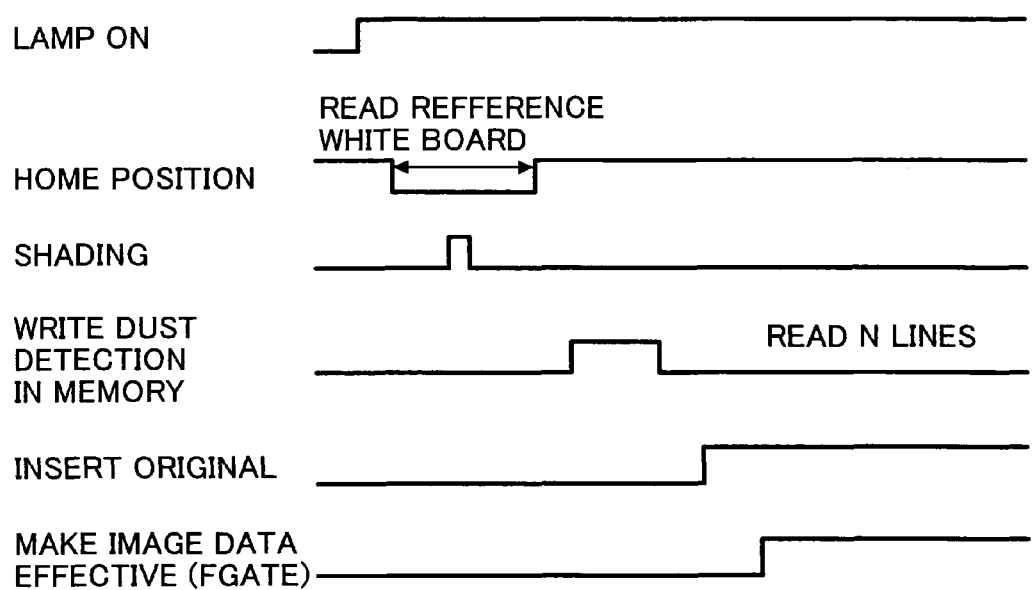
FIG. 26 is a timing chart of operations at the time when an original is read by the belt-type SDF.
Figure 27:
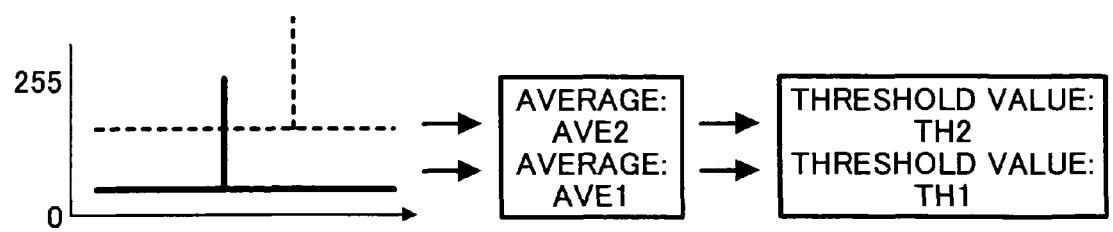
FIG. 27 is a diagram for explaining an example of an averaging circuit and a threshold generating circuit.
Figure 28:
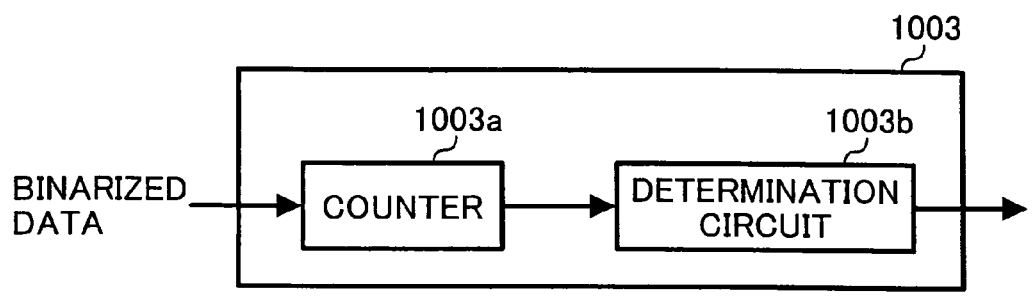
FIG. 28 is a block diagram of an internal structure of a determination circuit.
Figure 29:
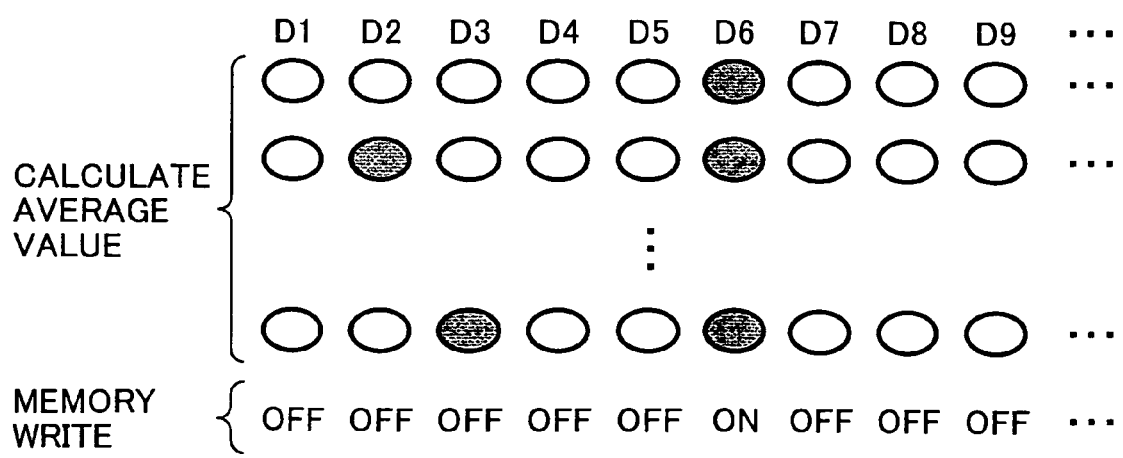
FIG. 29 is a diagram for explaining an example of determination in the determination circuit.

FIG. 25 is a diagram for explaining a structure around the SDF original glass 29b of the belt-type SDF 200. FIG. 26 is a timing chart of operations at the time when an original is read by the belt-type SDF 200.

As shown in FIGS. 25 and 26, until the SDF 200 starts reading an original, the first carriage 101 including the lighting lamp 28 serving as a light source and the mirror 9 is located in a home position. When the copy start key of the operation panel P is depressed, the lighting lamp 28 is turned on (lamp on) and the first carriage 101 moves to a position for reading a reference white board for shading correction. Reference white board reading is executed (shading) and the first carriage 101 moves to the home position again (home position). Note that the reference white board for shading correction is an original pressing member that is a white resin sheet provided in a bottom section of the SDF 200. Thereafter, before the original 50 to be read is inserted onto the SDF original glass 29b, the conveyor belt 205 is read and a dust detection result is written in the dust detection result memory 405 (write dust detection in memory). The averaging circuit 1001, the threshold generating circuit 1002, and the determination circuit 1003 in the dust detector 404 are turned on to generate N lines (plural lines) of memory writing pulses rather than one line of memory writing pulses. Thereafter, the original 50 to be read is inserted onto the SDF original glass 29b (insert original) and original reading is started. At the same time, a dust detection result is outputted from the dust detection result memory 405 and vertical streak correction processing is executed (make image data effective (FGATE)).

The averaging circuit 1001 executes idling of the conveyor belt 205 during the N lines of pulse signals generated for dust detection to calculate average concentration in the N lines. This is for the purpose of detecting whether dirt occurs in the conveyor belt 205 because of aging or the like of the conveyor belt 205. For example, referring to FIG. 27, an average AVE1 indicates a state in which no belt dirt has occurred and an average AVE2 indicates a state in which belt dirt has occurred. Note that a solid line in FIG. 27 indicates the average AVE1 and a broken line in FIG. 27 indicates the average AVE2.

The threshold generating circuit 1002 checks the average concentration inputted from the averaging circuit 1001 to judge whether dirt has occurred and varies a threshold value to be sent to the binarizer 601. For example, referring to FIG. 27, a threshold value TH1 indicates a state in which no belt dirt has occurred and a threshold value TH2 indicates a state in which belt dirt has occurred. Note that the solid line in FIG. 27 indicates the threshold value TH1 and the broken line in FIG. 27 indicates the threshold value TH2.

When a result of binarization by the binarizer 601 is directly written in the dust detection result memory 405, dust on the conveyor belt 205 is also detected. To prevent dust on the conveyor belt 205 from being detected, a counter 1003a shown in FIG. 28 counts the number of times of appearance of dust detection candidates in each pixel (Dn (n is an arbitrary integer) in FIG. 29) during the N lines of pulses generated for dust detection. A determination circuit 1003b determines whether a count number counted by the counter 1003a is equal to or larger than a predetermined threshold value. When it is determined that the count number is equal to or larger than the predetermined threshold value, the determination circuit 1003b determines that dust is present and writes a dust ON ("ON" shown in FIG. 29) bit in the dust detection result memory 405. When it is determined that the count number is not equal to or larger than the predetermined threshold value, the determination circuit 1003b determines that dust is not present and writes a dust OFF ("OFF" shown in FIG. 29) bit in the dust detection result memory 405.

Only when it is determined that the count number counted by the counter 1003a is equal to or larger than the predetermined threshold value, the determination circuit 1003b determines that dust is present and sets the dust ON bit in the dust detection result memory 405. Thereafter, the original 50 is inserted onto the SDF original glass 29b and original reading is started. At the same time, a dust detection result is outputted from the dust detection result memory 405 and vertical streak correction processing is executed.

As described above, according to a type of a conveyance-path-forming member, that is, a type of an original conveying mechanism, it is possible to perform processing for detecting an image deteriorated position suitable for the type.

For example, when control for writing of data in the dust detection result memory 405 is performed, in the case of the belt-type SDF, the conveyor belt 205 is idled, continuity of concentration of the conveyor belt 205 in a sheet feeding direction is detected, and ON/OFF of writing of data in the dust detection result memory 405 is controlled. In the case of the roller-type SDF, ON/OFF control for writing of data in the belt-type SDF is not performed.

When control for writing of data in the dust detection result memory 405 is performed, in the case of the belt-type SDF, a threshold value of binarization processing is varied according to the detected concentration of the conveyor belt 205. In the case of the roller-type SDF, a threshold value of binarization processing is not varied.

The embodiments described above are exemplary embodiments of the present invention and are not meant to limit the scope of the present invention only to the embodiments. It is possible to carry out the present invention in various modifications without departing from the spirit of the present invention. For example, it is also possible to execute the processing operations of the image processing apparatuses in the respective embodiments using a computer program incorporated in the image processing apparatuses. For example, this computer program is recorded in an optical recording medium, a magnetic recording medium, a magneto-optical recording medium, or a recording medium such as a semiconductor and read in the image processing apparatuses from the recording medium. This makes it possible to carry out the processing operations in the image processing apparatuses in the respective embodiments. It is also possible to carry out the processing operations in the image processing apparatuses in the respective embodiments by downloading the computer program to the image processing apparatuses from an external apparatus connected to the image processing apparatuses via a predetermined network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for processing image data including a plurality of areas of different types, the apparatus comprising:
    a reading unit that obtains the image data by reading a document through a reading glass;
    a line-delay memory that performs line-synchronization for image area determination;
    a dust detecting unit that detects a dirty place on the reading glass and outputs dust data as a dust detection result;
    a determining unit connected in parallel with the line-delay memory, wherein the determining unit determines a type of each of the areas in the image data;
    an edge enhancing unit that applies an edge enhancement to each of the areas based on the type determined; and
    a vertical-streak corrector that corrects vertical-streaks by executing interpolation processing using image data adjacent to the dust data that is output by the dust detecting unit; and
    a control unit that sets, when the type of an area determined is a text area, and when the area overlaps the dirty place detected, an amount of the edge enhancement for the area to be an amount used for a photo area in the image data that does not overlap the dirty place detected.

2. The apparatus according to claim 1, wherein the control unit receives a first signal indicating that the type of the area determined is the text area and a second signal indicating that the area overlaps the dirty place detected, and outputs, upon receiving both the first signal and the second signal, a predetermined value for reducing the amount of the edge enhancement.

3. The apparatus according to claim 2, wherein upon receiving the predetermined value, the edge enhancing unit reduces the amount of the edge enhancement for the area to the amount of the edge enhancement for the photo area in the image data.

4. The apparatus according to claim 1, wherein the reading glass is a glass used in a sheet-through scan system.

5. An apparatus for processing image data including a plurality of areas of different types, the apparatus comprising:
    a reference member that is substantially white;
    a reading unit that obtains first image data by reading a document through a reading glass, and second image data by reading the reference member through the reading glass;
    a detecting unit that detects a dirty place of the reading glass based on the second image data;
    a first determining unit that determines a type of each of the areas in the first image data to output a first signal indicating the type of each of the areas determined;
    a second determining unit that determines, when the type of an area determined by the first determining unit is a text area, whether the area overlaps the dirty place detected, and when the area overlaps the dirty place, outputs a second signal for controlling edge enhancement, without using the first signal, the second signal being designated in advance; and
    an image processing unit that applies an image processing to each of the areas in the first image data based on the first signal or the second signal.

6. The apparatus according to claim 5, wherein the second determining unit outputs the second signal when the type of the area is a photo area.

7. The apparatus according to claim 5, further comprising an interpolating unit that interpolates pixels of the first image data in an area corresponding to the dirty place detected, wherein
    the image processing unit applies the image processing to the first image data with the pixels interpolated.

8. The apparatus according to claim 5, further comprising an informing unit that informs a user of a position of the dirty place detected.

9. The apparatus according to claim 5, further comprising a requesting unit that requests a user to decide whether to stop reading the document when a size of the dirty place exceeds a first threshold or number of dirty places exceeds a second threshold.

10. The apparatus according to claim 9, further comprising an informing unit that informs the user that the reading glass is dirty when the user decided to stop reading the document.

11. The apparatus according to claim 5, wherein
    a type of the reference member includes a board and a belt,
    the reading unit performs different processing based on the type of the reference member, and
    the detecting unit performs different processing based on the type of the reference member.

12. The apparatus according to claim 11, wherein
    the type of the reference member is the board that is scanned line by line, and the detecting unit detects the dirty place based on the second image data of one scanning line binarized using a binarization threshold.

13. The image processing apparatus according to claim 11, wherein
the type of the reference member is the belt that is scanned line by line,
the detecting unit detects the dirty place based on the second image data of a predetermined number of scanning lines binarized using a binarization threshold, and
the binarization threshold varies according to an average concentration of the second image data of the predetermined scanning lines.

14. A method for processing image data including a plurality of areas of different types, the method comprising:
obtaining the image data by reading a document through a reading glass;
detecting a dirty place on the reading glass and outputting dust data as a dust detection result;
performing line-synchronization for image area determination with a line-delay memory;
determining a type of each of the areas in the image data with an image area determination unit that is connected in parallel with the line-delay memory;
applying an edge enhancement to each of the areas based on the type determined;
executing interpolation processing that corrects vertical-streaks with a vertical-streak corrector using image data adjacent to the dust data that is output in the detecting step; and
setting, when the type of an area determined is a text area, and when the area overlaps the dirty place detected, an amount of the edge enhancement for the area to be an amount used for a photo area in the image data that does not overlap the dirty place detected.

15. The method according to claim 14, wherein the setting step comprises:
receiving a first signal indicating that the type of the area determined is the text area and a second signal indicating that the area overlaps the dirty place detected, and
outputting, upon receiving both the first signal and the second signal, a predetermined value for reducing the amount of the edge enhancement.

16. The method according to claim 15, wherein the setting step comprises, after receiving the predetermined value, reducing the amount of the edge enhancement for the area to the amount of the edge enhancement for the photo area in the image data.

17. The method according to claim 14, wherein the reading glass is a glass used in a sheet-through scan system.

* * * * *